(12) United States Patent
Yun et al.

(10) Patent No.: US 8,300,714 B2
(45) Date of Patent: Oct. 30, 2012

(54) APPARATUS AND METHOD FOR REDUCING PEAK TO AVERAGE POWER RATIO IN AN ORTHOGONAL FREQUENCY DIVISION MULTIPLEXING SYSTEM

(75) Inventors: Sung-Ryul Yun, Suwon-si (KR); Jae-Yoel Kim, Suwon-si (KR); Hak-Ju Lee, Incheon (KR); Hong-Sil Jeong, Seoul (KR); Se-Ho Myung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1183 days.

(21) Appl. No.: 12/133,108

(22) Filed: Jun. 4, 2008

(65) Prior Publication Data

US 2008/0298490 A1  Dec. 4, 2008

(30) Foreign Application Priority Data

Jun. 4, 2007 (KR) ........................ 10-2007-0054544
Jan. 14, 2008 (KR) ........................ 10-2008-0004125
Feb. 18, 2008 (KR) ........................ 10-2008-0014651
Mar. 18, 2008 (KR) ........................ 10-2008-0025142

(51) Int. Cl.
*H04K 1/10* (2006.01)

(52) U.S. Cl. ........ 375/260; 375/259; 375/316; 375/296; 370/206; 370/208; 370/210; 370/236; 370/242

(58) Field of Classification Search .................. 375/260, 375/259, 316, 296; 370/206, 208, 210, 236, 370/242
See application file for complete search history.

(56) References Cited

U.S. PATENT DOCUMENTS

| 2005/0089109 A1* | 4/2005 | Yun et al. ........................ 375/260 |
| 2005/0100108 A1 | 5/2005 | Yun et al. |
| 2006/0078066 A1 | 4/2006 | Yun et al. |
| 2007/0242598 A1* | 10/2007 | Kowalski ........................ 370/206 |
| 2010/0142364 A1* | 6/2010 | Sahlman ........................ 370/210 |

OTHER PUBLICATIONS

Park et al., "Tone Reservation Method for PAPR Reduction Scheme", IEEE 802.16 Broadband Wireless Access Working Group, Oct. 31, 2003.

* cited by examiner

*Primary Examiner* — Zewdu Kassa
(74) *Attorney, Agent, or Firm* — The Farrell Law Firm, P.C.

(57) ABSTRACT

A method for reducing a Peak to Average Power Ratio (PAPR) using reserved tones in a transmission apparatus of an Orthogonal Frequency Division Multiplexing (OFDM) communication system is provided. The method includes detecting a subcarrier spacing interval and the number of spaced symbols based on a predetermined pilot pattern upon signal reception, and determining positions of shifted reserved tones obtained by shifting positions of reserved tones allocated to a predetermined symbol during the number of the spaced symbols at intervals of the spacing interval; determining an impulse waveform obtained by rotating a phase of a complex value of an impulse stored in a memory, using the determined positions of frequency-domain reserved tones of each symbol; calculating a subtrahend for a PAPR of an output signal using the phase-rotated impulse waveform; and reducing a PAPR of an input signal by performing a gradient algorithm using the phase-rotated impulse waveform.

24 Claims, 9 Drawing Sheets

APPARATUS AND METHOD FOR REDUCING PEAK TO AVERAGE POWER RATIO IN AN ORTHOGONAL FREQUENCY DIVISION MULTIPLEXING SYSTEM

PRIORITY

This application claims priority under 35 U.S.C. §119(a) to a Korean Patent Application filed in the Korean Intellectual Property Office on Jun. 4, 2007 and assigned Serial No. 2007-54544, a Korean Patent Application filed in the Korean Intellectual Property Office on Jan. 14, 2008 and assigned Serial No. 2008-4125, a Korean Patent Application filed in the Korean Intellectual Property Office on Feb. 18, 2008 and assigned Serial No. 2008-14651, and a Korean Patent Application filed in the Korean Intellectual Property Office on Mar. 18, 2008 and assigned Serial No. 2008-25142, the disclosures of all of which are incorporated herein by reference.

BACKGROUND OF THE INVENTION

1. Field of the Invention

The present invention relates generally to a mobile communication system, and in particular, to a method and apparatus for reducing a Peak to Average Power Ratio (PAPR) in an Orthogonal Frequency Division Multiplexing (OFDM) system.

2. Description of the Related Art

OFDM is widely applied to digital transmission technologies such as Digital Audio Broadcasting (DAB), Digital Television, Wireless Local Area Networking (WLAN), Wireless Asynchronous Transfer Mode (WATM), etc. Although the OFDM scheme is similar to the conventional Frequency Division Multiplexing (FDM) scheme, the OFDM scheme has a characteristic that it can obtain the optimal transmission efficiency during high-speed data transmission by transmitting data while maintaining orthogonality between multiple subcarriers, and can also obtain the optimal transmission efficiency during high-speed data transmission as it has high frequency efficiency and is robust against multipath fading.

In addition, OFDM has high frequency efficiency and is robust against frequency-selective fading since frequency spectrums are used on an overlapping basis, and can reduce an Inter-Symbol Interference (ISI) effect by using a guard interval. Further, OFDM enables simple design for a hardware structure of an equalizer, and is robust against impulse noises. Due to such advantages, OFDM is being actively used for the communication systems.

However, despite its many advantages, the OFDM system causes a high Peak to Average Power Ratio (PAPR) due to multi-carrier modulation, i.e., since OFDM transmits data using multiple carriers, the final OFDM signal has a significant change in amplitude, as the signal's amplitude becomes a sum of amplitudes of the carriers. In addition, if phases of the carriers are coincident with each other, the amplitude has a very high value.

Such a high-PAPR signal, however, may get out of a linear operation range of a High Power Amplifier (HPA). Therefore, the high-PAPR signal may suffer from distortion after passing through the HPA, causing a reduction in the system performance.

To address the high-PAPR problems of the OFDM system, several PAPR reduction techniques have been provided, and include Clipping, Coding, SeLected Mapping (SLM), Partial Transmit Sequence (PTS), Tone Injection (TI), Tone Reservation (TR), etc.

Of the PAPR reduction techniques, the TR scheme reserves L tones in N subcarriers, and transmits no data on the L reserved tones to reduce the PAPR. In this case, a receiver disregards the L tones that have transmitted no information signal, and restores information signals only on the (N-L) tones, contributing to a decrease in complexity of the receiver structure.

A gradient algorithm is one of the typical methods of using the L reserved tones to reduce the PAPR in the TR scheme. The gradient algorithm is provided by applying a method similar to the Clipping technique to the TR scheme.

The gradient algorithm is used to generate signals having the impulse characteristics using L tones that transmit no information signal, and to clip output signals of Inverse Fast Fourier Transform (IFFT). If signals having the impulse characteristics are added to the IFFT's output signals, data distortion occurs only on the L tones, and no data distortion occurs in the other frequency regions.

In the Clipping technique, the noises generated by clipping may affect all subcarriers. However, in the TR technique, the noises generated by clipping affect only some reserved subcarriers rater than affecting all the subcarriers.

The gradient algorithm optimizes impulse waveforms so that the peak of IFFT output signals is reduced in the time domain. PAPR-reduced signals, which are generated by adding a sum of impulse waveforms optimized by the gradient algorithm to the IFFT's output signals, are transmitted to a receiver.

Then the receiver, since the receiver already has information on positions of L tones, only needs to receive data on the remaining subcarriers except for the L reserved tones.

With reference to the accompanying drawings, the TR method will now be described.

FIG. 1 is a diagram illustrating a structure of a general TR scheme-based transmitter.

An (N-L)-point input signal (X) 105 and an L-reserved tone signal 110 are input to a tone reservation unit 120, and the tone reservation unit 120 reserves the L-reserved tone signal 110 in a subcarrier position previously agreed upon between a transmitter and a receiver. In this case, zero (0) is inserted into the L tones, with no data transmitted thereon. When the parallel data X and a sum of the L reserved tones, output from the tone reservation unit 120, are input to an N-point IFFT unit 130, the N-point IFFT unit 130 performs an IFFT calculation on the input data, and outputs the result to a Parallel-to-Serial (P/S) converter 140. Then the P/S converter 140 generates a time-domain output signal X by processing the input signal. Next, a gradient algorithm unit 150 transmits a transmission signal X+C obtained by adding a signal C generated by the gradient algorithm unit 150 to the output signal X of the IFFT unit 130. In this case, the gradient algorithm unit 150 calculates the signal C so that a PAPR of the output signal X is reduced, using an impulse waveform read from a memory 160.

The signal C added to L tones to reduce the PAPR is determined as follows. L subcarriers are previously reserved and used for a code C; positions of the L subcarriers are fixed by the tone reservation unit 120 during their initial transmission and remain unchanged during data transmission. The code C can be expressed as Equation (1).

$$C_k = \begin{cases} C_k, & k \in \{i_1, i_2, \ldots, i_L\} \\ 0, & k \notin \{i_1, i_2, \ldots, i_L\} \end{cases} \quad (1)$$

In Equation (1), k denotes an index of the tone reservation unit 120. In this case, an input signal X is reserved in a subcarrier other than the code C as shown in Equation (2), and i represents the position of the reserved tone in each FFT.

$$X_k = \begin{cases} X_k, & k \notin \{i_1, i_2, \ldots, i_L\} \\ 0, & k \in \{i_1, i_2, \ldots, i_L\} \end{cases} \quad (2)$$

Minimization of PAPR is achieved by optimizing these L subcarriers. $\tilde{C}$ is optimized by Equation (3) so that PAPR is low.

$$\tilde{C} = \operatorname*{Argmin}_{\tilde{C}} \left( \max_{n=0 \ldots N-1} |x_n + c_n| \right) \quad (3)$$

In Equation (3), $c_n$ denotes an $n^{th}$ element value of a time-domain vector obtained by performing IFFT on a vector C. To find an optimized signal of C, calculation of Equation (3) is performed. To solve Equation (3), complex linear calculation should be performed. In actual implementation, however, the gradient algorithm is used, which can obtain the similar performance only with simple calculation.

The code C is optimized so as to remove the peak value of a vector x. If $x^{clip}$ is defined as a vector where x is clipped to a certain level A, Equation (4) is derived therefrom.

$$x - x^{clip} = \sum_i \beta_i \delta[n - m_i] \quad (4)$$

In Equation (4), $\beta_i$ denotes a clipping value, $m_i$ denotes a position where a corresponding vector is clipped, and $\delta$ denotes an impulse function.

If c is defined as in Equation (5) below, Equation (6) can be derived therefrom, making it possible to reduce the peak value of a transmission symbol.

$$c = -\sum_i \beta_i \delta[n - m_i] \quad (5)$$

$$x + c = x^{clip} \quad (6)$$

Therefore, c can be construed as a sum of delayed and scaled impulse functions. However, in the frequency domain, $\hat{C}=FFT(c)$ has a non-zero value in most frequency positions, and distorts values of data symbols except for L reserved positions. Therefore, in the frequency domain, a waveform having a characteristic of an impulse function, which is affected only in the L reserved positions and is not affected in the other positions, must be used for clipping.

A waveform having the impulse characteristics is designed as follows.

For example, $1_L$ is a vector having a value 1 in L reserved positions and a value 0 in the remaining positions, and p is defined as Equation (7).

$$p = p[n] = [p_0 \, p_1 \ldots p_{N-1}] = \frac{\sqrt{N}}{L} IDFT(1_L) \quad (7)$$

In Equation (7), $p_0=1$, $p_1 \ldots p_{N-1}$ and each has a much smaller value compared with $p_0$. When $p[((n-m_i))_N]$ is defined as a value obtained by circular-shifting p by $m_i$, even though the value undergoes Discrete Fourier Transform (DFT), only its phase varies and the value has a value 0 in the positions other than the L reserved positions in the frequency domain.

In designing the waveform having the impulse characteristics as stated above, the waveform cannot become similar to the ideal impulse waveform unless the waveform is designed such that a size of the remaining $p_1 \ldots p_{N-1}$ except for $p_0$ is small. As the size of $p_1 \ldots p_{N-1}$ is smaller, a change in size of other signals in the positions except for the position of $p_0$ is smaller during execution of clipping. If $p_1 \ldots p_{N-1}$ are designed to be large, the peak of other signals may increase again in the clipping process, causing a decrease in the PAPR reduction performance.

Since the positions of the L reserved tones determine an impulse waveform and the impulse waveform exerts influence on the PAPR reduction performance as stated above, one well-designed reserved tone position is generally previously determined in applying a tone reservation method to the OFDM system. A time-domain impulse waveform generated by this reserved tone is also previously stored. Through this process, it is possible to avoid calculating positions of reserved tones and an impulse waveform for every symbol.

FIG. 2 illustrates a frame structure of a general broadcast communication system. Several OFDM symbols constitute one frame, and a structure of pilot tones shows a scattered structure where positions of the pilot tones change in every OFDM symbol. Since such pilot tones are used for channel estimation, the pilot tones should not undergo interference and/or distortion.

However, when the above-stated structure of predetermined reserved tones is used, a collision may occur between the reserved tones and the pilot tones in the frame structure of FIG. 2.

FIG. 3 illustrates a collision occurring between pilot tones and reserved tones when one reserved tone based on the conventional tone reservation scheme is used in the frame structure of FIG. 2.

In other words, while no collision occurs between the reserved tones and the pilot tones in the case 301 of FIG. 3, a collision may occur between the reserved tones and the pilot tones in the cases 303, 305, and 307. Therefore, there is a demand for an apparatus and method for designing and managing reserved tones while avoiding the collision between the pilot tones and the reserved tones.

SUMMARY OF THE INVENTION

An aspect of the present invention is to address at least the problems and/or disadvantages and to provide at least the advantages described below. Accordingly, an aspect of the present invention is to provide a method and apparatus for designing and managing reserved tones to be suitable for a frame structure of a communication system where the reserved tones are used for PAPR reduction.

Another aspect of the present invention is to provide a method and apparatus for designing and managing reserved tones while avoiding a collision between pilot tones and reserved tones in a frame structure of a communication system.

According to one aspect of the present invention, there is provided a method for reducing a Peak to Average Power Ratio (PAPR) using reserved tones in a transmission apparatus of an Orthogonal Frequency Division Multiplexing (OFDM) communication system. The method includes detecting a subcarrier spacing interval and a number of spaced symbols based on a predetermined pilot pattern upon signal reception, and determining positions of shifted reserved tones obtained by shifting positions of reserved tones allocated to a predetermined symbol during the number of the spaced symbols at intervals of the spacing interval; determining an impulse waveform obtained by rotating a phase of a complex value of an impulse stored in a memory, using the determined positions of frequency-domain reserved tones of each symbol; calculating a subtrahend for a PAPR of an output signal using the phase-rotated impulse waveform; and reducing a PAPR of an input signal by performing a gradient algorithm using the phase-rotated impulse waveform.

According to another aspect of the present invention, there is provided a transmission apparatus for reducing a Peak to Average Power Ratio (PAPR) using reserved tones in an Orthogonal Frequency Division Multiplexing (OFDM) communication system. The transmission apparatus includes a memory for storing a number of and positions of reserved tones allocated to a predetermined symbol, and an impulse waveform based on the positions of the reserved tones; a controller for detecting a subcarrier spacing interval and the number of spaced symbols based on a predetermined pilot pattern upon signal reception, determining positions of shifted reserved tones obtained by shifting positions of reserved tones allocated to a predetermined symbol during the number of the spaced symbols at intervals of the spacing interval, and determining a new impulse waveform generated by rotating a phase of a complex value according to the determined positions of shifted reserved tones; a tone reservation unit for reserving data, pilots and reserved tones in a subcarrier position for every symbol according to a control signal from the controller; and a gradient algorithm unit for calculating a subtrahend for a PAPR using an updated impulse waveform received from the controller, and adding the calculated subtrahend for the PAPR to an input signal.

According to further another aspect of the present invention, there is provided a method for reducing a Peak to Average Power Ratio (PAPR) using reserved tones in a reception apparatus of an Orthogonal Frequency Division Multiplexing (OFDM) communication system. The method includes detecting a subcarrier spacing interval and a number of spaced symbols based on a predetermined scattered pilot pattern upon signal reception, and determining positions of shifted reserved tones obtained by shifting positions of predetermined reserved tones during the number of the spaced symbols at intervals of the spacing interval; extracting data signals transmitted in positions except for the reserved tone positions in every symbol using the determined reserved tone positions; and performing demodulation on the extracted data signals.

According to yet another aspect of the present invention, there is provided a reception apparatus for reducing a Peak to Average Power Ratio (PAPR) using reserved tones in an Orthogonal Frequency Division Multiplexing (OFDM) communication system. The reception apparatus includes a memory for storing a number of and positions of reserved tones allocated to a predetermined symbol; a controller for detecting a subcarrier spacing interval and a number of spaced symbols based on a predetermined scattered pilot pattern upon signal reception, and determining positions of shifted reserved tones obtained by shifting positions of predetermined reserved tones during the number of the spaced symbols at intervals of the spacing interval; a data tone signal extractor for extracting data signals transmitted in positions except for the reserved tone positions in every symbol using information on the reserved tone positions received from the controller; and a data demodulator for performing demodulation on signals output from the data tone signal extractor.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

As described above, the pilot structure in a frame of the communication system varies according to the OFDM symbol. Therefore, the conventional reserved tone design method cannot be applied intact in the tone reservation scheme according to the present invention, so there is a need for a reserved tone design method that is adapted to the frame structure.

Figure 1:
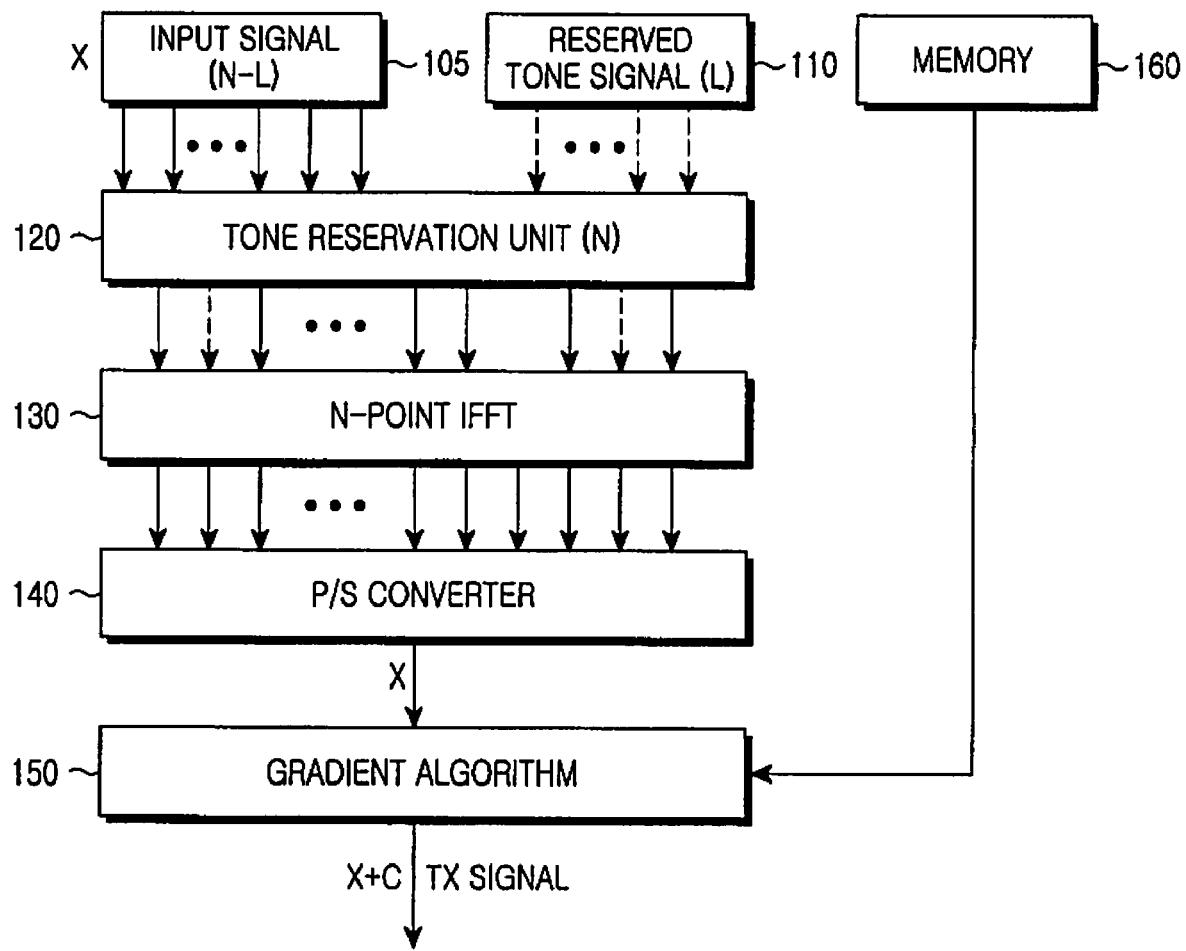
FIG. 1 is a diagram illustrating a structure of a general TR scheme-based transmitter.
Figure 2:
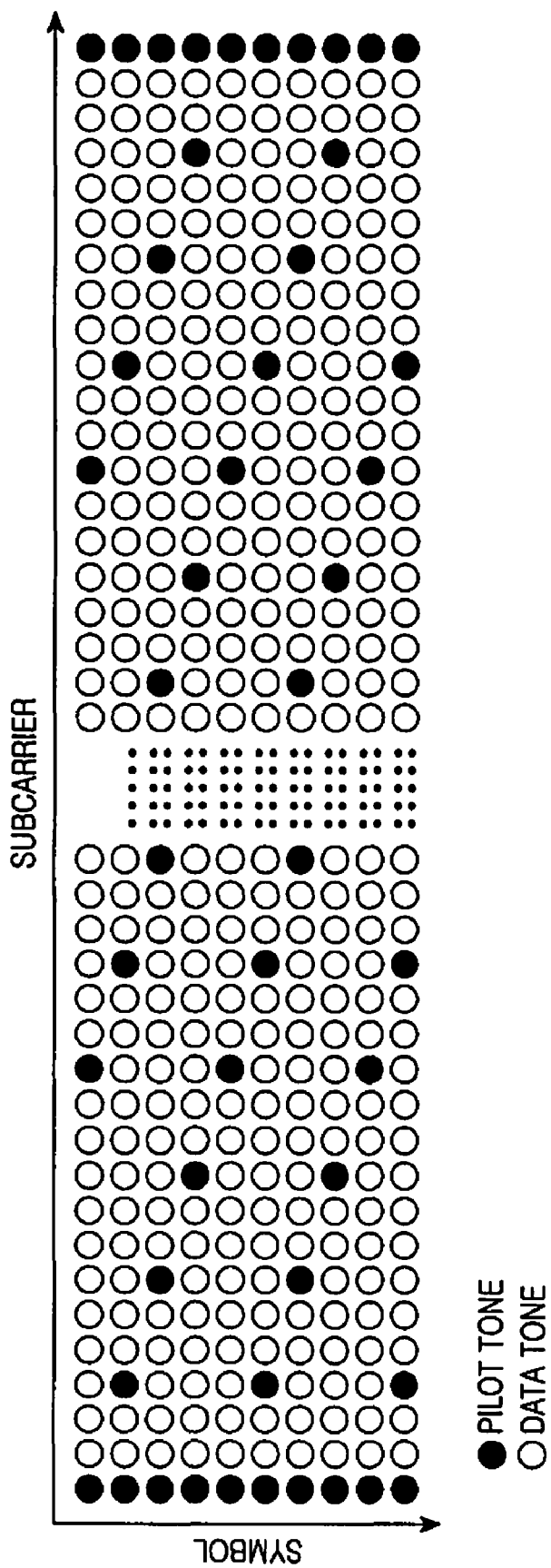
FIG. 2 is a diagram illustrating a frame structure in which positions of data subcarriers and pilot tones vary.
Figure 3:
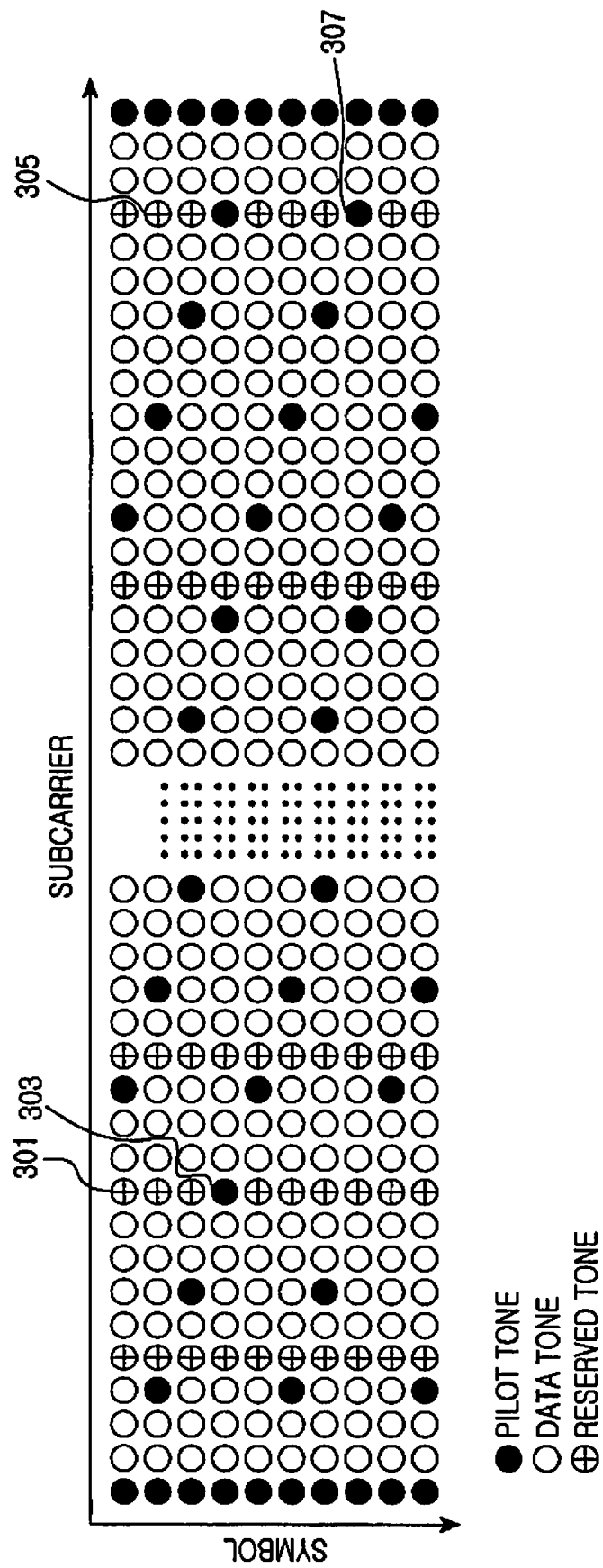
FIG. 3 is a diagram illustrating a collision occurring between pilot tones and reserved tones in the conventional tone reservation scheme.

The pilot structure of FIG. 2 is composed of continual pilots remaining in a predetermined subcarrier over several OFDM symbols, and scattered pilots, which exist only in one OFDM symbol and are uniformly distributed in the frequency domain.

In the frame having the scattered-pilot structure, since pilot positions are different in every OFDM symbol, reserved tone positions should also vary. Therefore, every OFDM symbol should have different reserved tones.

However, if every OFDM symbol has different reserved tones, impulse waveforms generated with the reserved tones also have different signals. Accordingly, the system should store information on all impulse waveforms in a memory. When $N_{Frame}$ OFDM symbols exist in one frame, a complex value necessary for storing impulse waveforms becomes $N_{Frame} \times N_{FFT}$, where $N_{FFT}$ denotes an FFT size, i.e., the memory size necessary for storing impulse waveforms increases with the number of OFDM symbols in the frame.

The present invention provides a method for applying one reserved tone to every OFDM symbol in a frame, rather than applying different reserved tones to every OFDM symbol.

Regarding the scattered-pilot structure in FIG. 2, the pilot tones shift at predetermined intervals in every OFDM symbol. With use of such characteristics, the present invention can avoid the collision between reserved tones and scattered pilots by shifting even the reserved tone positions at the same intervals as the scattered pilots.

Figure 4:
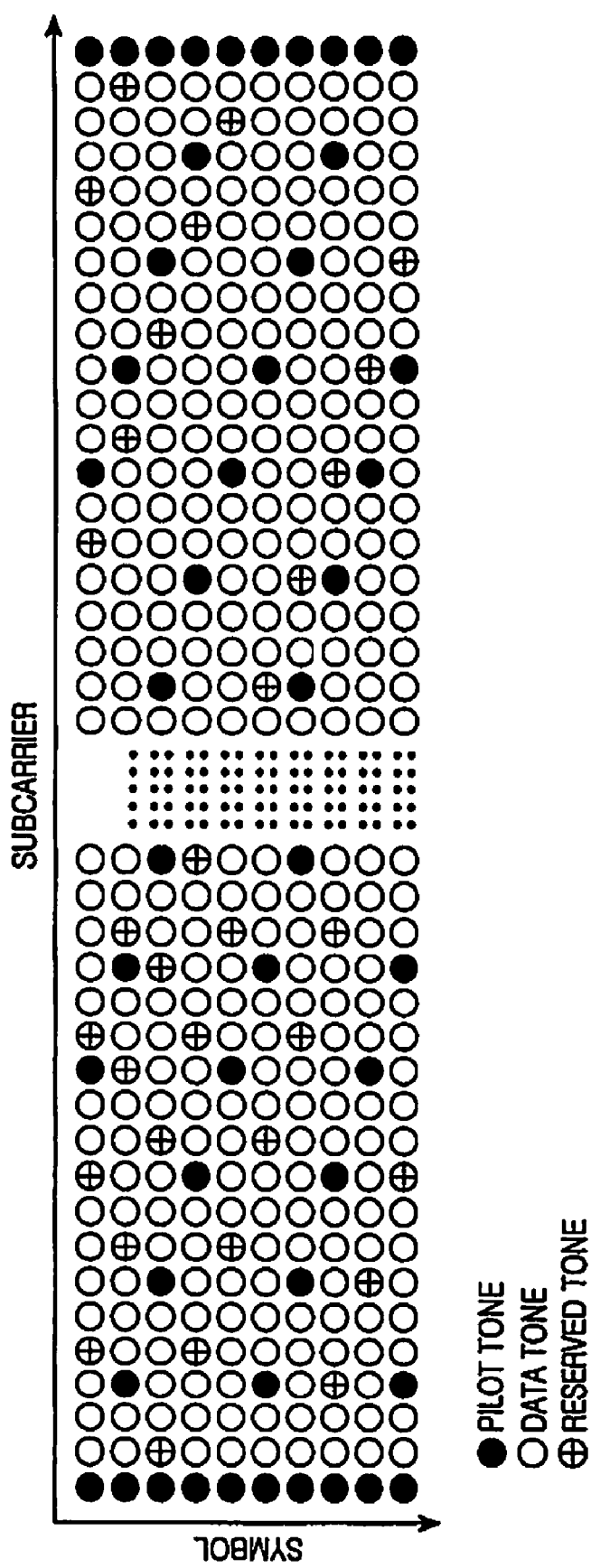
FIG. 4 is a diagram illustrating a frame structure designed to avoid a collision between scattered pilots and reserved tones according to an embodiment of the present invention.

FIG. 4 illustrates a frame structure designed to avoid a collision between scattered pilots and reserved tones according to an embodiment of the present invention.

The frame structure shown in FIG. 4 avoids a collision between reserved tones and pilot tones by setting positions of reserved tones designed in an OFDM symbol such that an interval therebetween is equal to a shift interval of scattered pilot tones.

If one reserved tone is reused in every symbol, it is possible to solve the memory increase problem occurring, as a position of the reserved tone should be stored for every symbol.

If the position of the reserved tone is circular-shifted in the frequency domain, regarding an impulse waveform generated by the reserved tone, the complex value of the reserved tone remains unchanged and only the phase of the reserved tone changes. Since the change in phase corresponds to a shift interval of the reserved tone position, it is possible to determine the change in phase caused by the shift interval of the reserved tone position when only the initial phase information is known.

Therefore, the method of the present invention for shifting one tone reserve position according to a pilot pattern and modifying an impulse waveform can be applied to all OFDM symbols in the frame.

Figure 5:
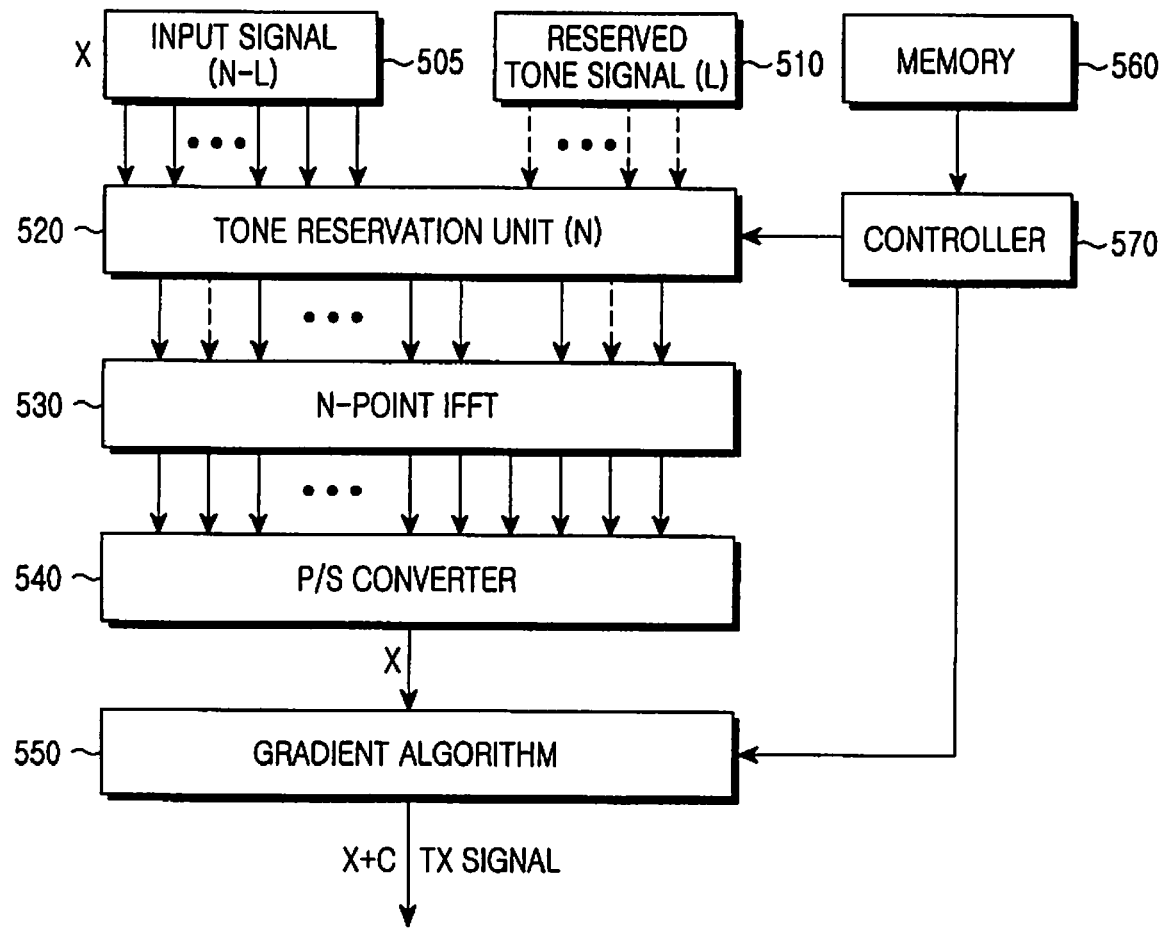
FIG. 5 is a block diagram illustrating a structure of a TR-based transmission apparatus according to an embodiment of the present invention.

FIG. 5 is a block diagram illustrating a structure of a TR-based transmission apparatus according to an embodiment of the present invention.

Referring to FIG. 5, an (N-L)-point input signal (X) 505 and an L-reserved tone signal 510 are input to a tone reservation unit 520, and the tone reservation unit 520 reserves the L-reserved tone signal 510 in a subcarrier position previously agreed upon between a transmitter and a receiver. In this case, zero (0) is inserted into the L tones, with no data transmitted thereon.

When the parallel data X and a sum of the L reserved tones are input to an N-point IFFT unit 530, the N-point IFFT unit 530 performs an IFFT calculation on the input data. Thereafter, a Parallel-to-Serial (P/S) converter 540 outputs a time-domain signal x.

Next, the transmission apparatus adds a signal C, generated by a gradient algorithm unit 550, to the output signal x of the IFFT unit 530, and transmits the resulting signal X+C to the receiver. In this case, the gradient algorithm unit 550 calculates the signal C so that PAPR of the output signal x is reduced, using an impulse waveform read from a memory 560.

The number of and positions of reserved tones predetermined according to the OFDM size, shown in Table 4, is stored in the memory 560, i.e., as the memory 560 stores therein a reserved tone position pattern allocated to one predetermined symbol in the frequency domain, rather than storing position information of different frequency-domain reserved tones for every symbol, the one reserved tone position pattern is used for determining positions of shifted reserved tones for every symbol.

Further, the memory 560 stores signals having an impulse shape calculated using Equation (7) according to the reserved tone positions.

A controller 570 detects information on the number of and positions of predetermined reserved tones from the memory 560 upon signal reception, to determine positions of reserved tones that are collision-free with data and pilots according to the OFDM size and pilot positions, and transmits the determined position information to the tone reservation unit 520.

The controller 570 determines reserved tone positions according to the OFDM symbol in the frame, in the following method.

The controller 570 detects a subcarrier spacing interval and the number of spaced symbols based on a predetermined pilot pattern, and determines positions of shifted reserved tones obtained by shifting positions of reserved tones allocated to one predetermined symbol for (during) the number of the spaced symbols at the spacing intervals.

The controller 570 can use Equation (9) to determine positions of the shifted reserved tones. The controller 570 transfers the determined position information of the reserved tones corresponding to every symbol to the tone reservation unit 520.

The controller 570 adjusts a phase of the impulse waveform by the shift interval calculated for each OFDM symbol index, and transfers the phase-adjusted impulse waveform to the gradient algorithm unit 550. Even though the reserved tone positions are circular-shifted, a size of the impulse waveform does not change, making it possible to maintain the same PAPR reduction performance.

The tone reservation unit 520 allocates reserved tones to an OFDM symbol so that no collision occurs between the reserved tones and the data and pilots, using the position information of the reserved tones corresponding to each OFDM symbol, provided from the controller 570.

However, regarding the shift interval, the tone reservation unit 520, rather than the controller 570, can calculate the shift interval and send the shift interval to the controller 570 so that the controller 570 can calculate the phase.

Figure 6:
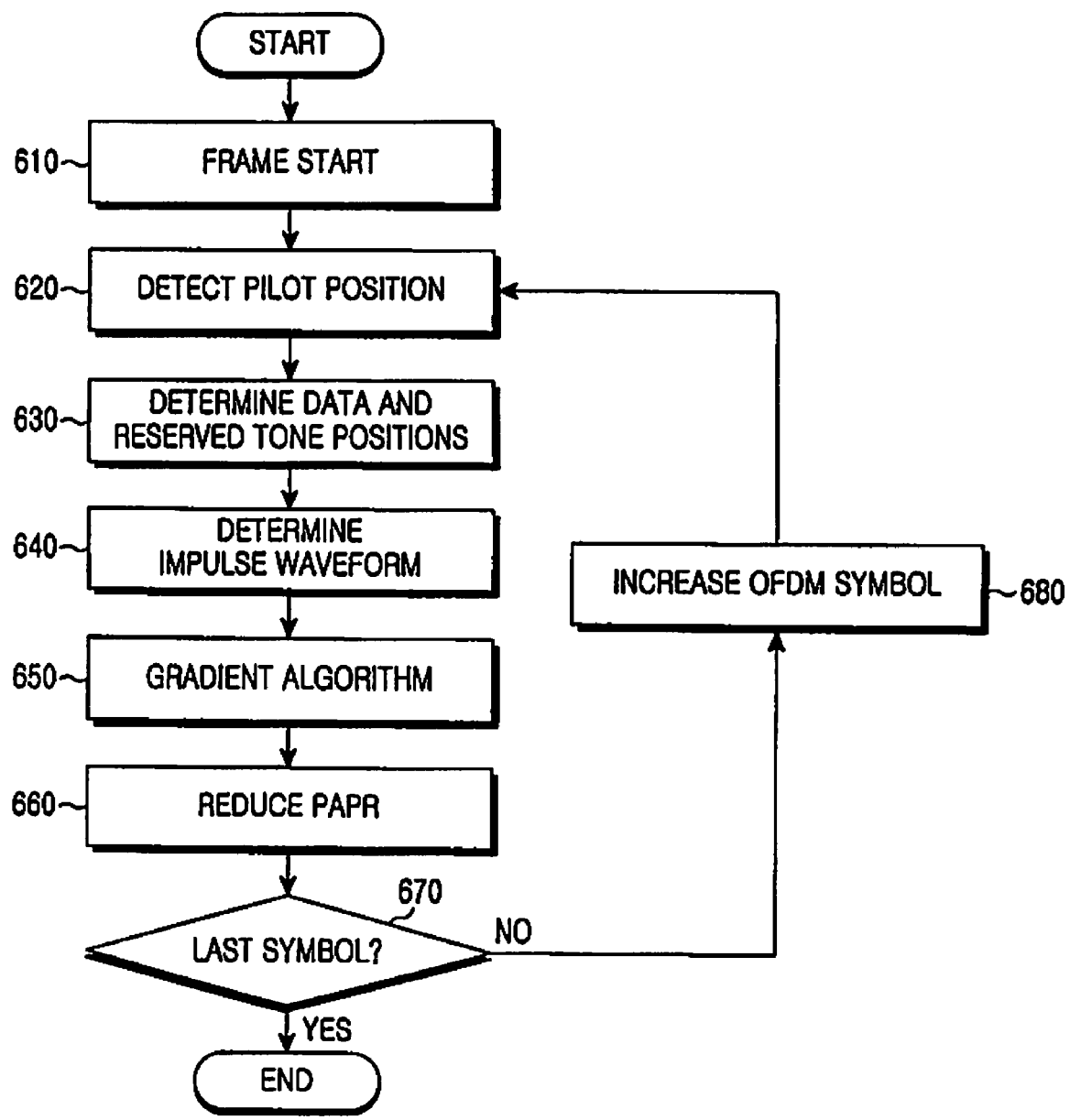
FIG. 6 is a flowchart illustrating a method for reducing PAPR by means of the TR-based transmission apparatus according to an embodiment of the present invention.

FIG. 6 is a flowchart illustrating a method for reducing PAPR by means of the TR-based transmission apparatus according to an embodiment of the present invention.

Referring to FIG. 6, as a frame starts in step 610, the transmission apparatus detects pilot positions for every OFDM symbol in step 620. The transmission apparatus determines positions of data and reserved tones using the detected pilot positions in step 630. For this determination, the transmission apparatus calculates a subcarrier shift value for preventing the pilot positions from overlapping the reserved tone positions, and determines the data and reserved tone positions based on the determined shift value.

The method for determining the reserved tone positions includes detecting a subcarrier spacing interval and the number of spaced symbols based on a predetermined pilot pattern upon signal reception, and determining positions of shifted reserved tones obtained by shifting positions of the reserved tones allocated to one predetermined symbol during the number of spaced symbols at the spacing intervals. The positions of the shifted reserved tones can be calculated using Equation (9). Thereafter, in step 640, the transmission apparatus determines an impulse waveform by rotating a phase of the complex value stored in a memory using the determined shift value. The transmission apparatus performs a gradient algorithm using the phase-rotated impulse waveform in step 650, and reduces PAPR of IFFT output signals in step 660. After reducing PAPR, the transmission apparatus repeats the processing process on the next OFDM symbol, i.e., the transmission apparatus determines, in step 670, whether the transmission apparatus has performed the PAPR reduction process through the last OFDM symbol in the frame. If it is determined that the transmission apparatus has performed the PAPR reduction process through the last OFDM symbol in the frame, the transmission apparatus ends the process.

However, if it is determined in step 670 that the corresponding OFDM symbol is not the last OFDM symbol in the frame, the transmission apparatus increases the OFDM symbol index in step 680, and then returns to step 620.

An exemplary TR method according to the present invention, which is applied in a broadcast communication system, will now be described.

Figure 7:
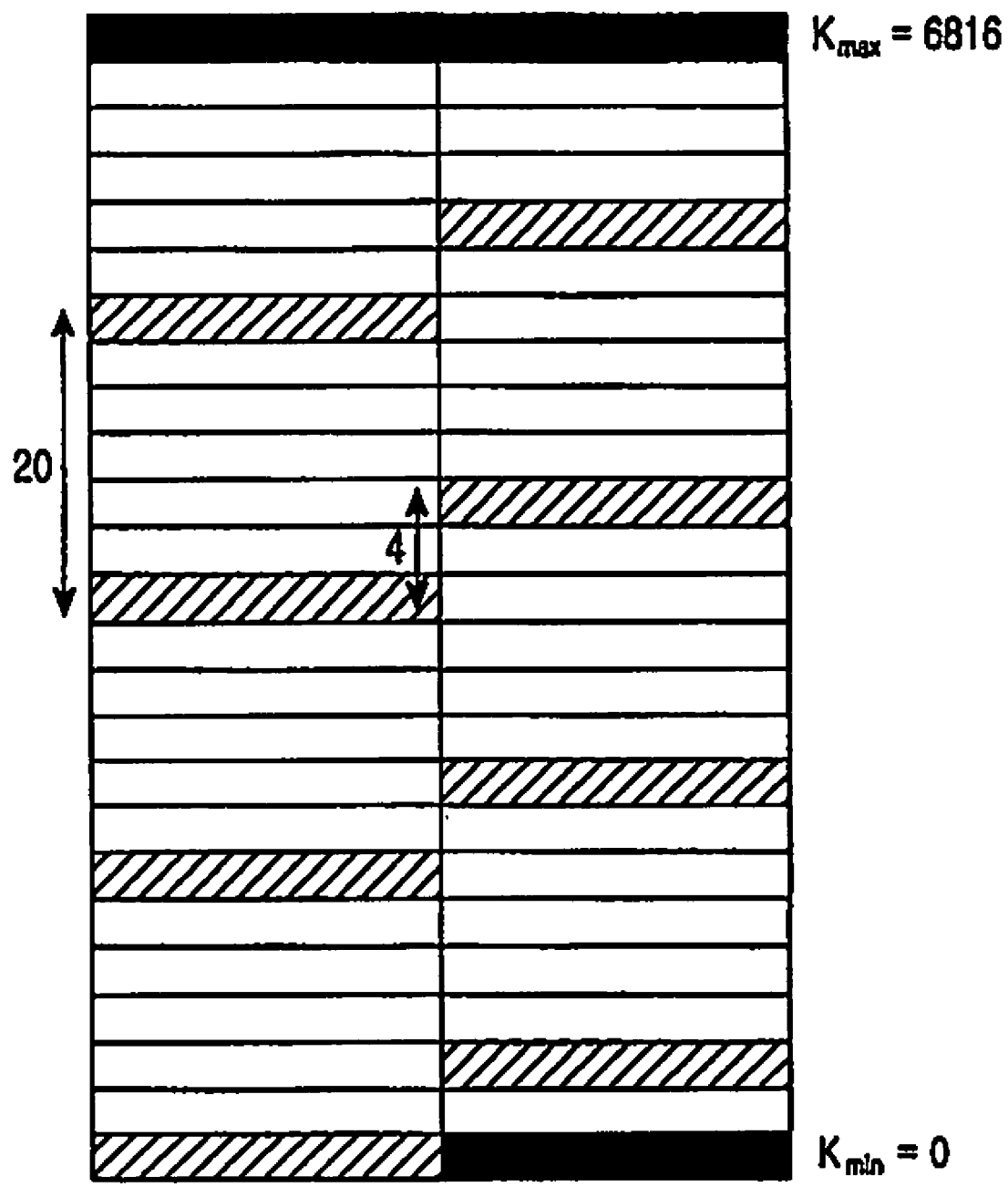
FIG. 7 is a diagram illustrating a scattered-pilot structure in a frame structure of a Digital Video Broadcasting (DVB) system.

FIG. 7 illustrates a scattered-pilot structure in a frame structure of a Digital Video Broadcasting (DVB) system. Of 8192 tones, 6817 tones except for 1375 guard bands are composed of data, pilots, and reserved tones. A pattern of the pilots is expressed as Equation (8).

$$\{k = k_{min} + [4 \times ((l-1) \bmod 20) + 20\, p]p\ \text{integer}, p \in [0; 342]\} \quad (8)$$

In Equation (8), k denotes a tone index, $k_{min}$ denotes the minimum tone index, and l denotes an OFDM index.

If scattered pilots are situated at intervals of 20 tones as shown in FIG. 7, the scattered pilots undergo circular shift at intervals of 4 subcarriers as an OFDM symbol increases.

The reserved tone positions applied in the present invention are as shown in Table 1. TR shows 75 reserved tone positions.

TABLE 1

Reserved Tone Index 85 195 278 346 506 517 644 683 783 919 1021 1084 1125 1250 1285
1413 1493 1618 1730 1847 1937 1996 2075 2175 2247 2313 2423 2549
2587 2736 2870 2925 3054 3142 3207 3255 3359 3441 3512 3621 3708
3761 3835 3954 4012 4163 4184 4281 4374 4538 4591 4695 4773 4910
4967 5064 5194 5255 5287 5370 5514 5539 5659 5801 5963 5991 6108
6216 6236 6343 6466 6523 6577 6654 6756

The reserved tone positions in Table 1 undergo circular shifts at intervals of 4 tones like the scattered pilots. Therefore, the reserved tone positions in Table 1 increase in tone index by 0, 4, 8, 12 and 16, as an OFDM symbol increases.

DVB, which is the European broadcast standard, considers several OFDM sizes, and supports 1K, 2K, 4K, 8K, 16K and 32K modes as follows. Table 2 shows OFDM sizes, the number of data tones, and the number of reserved tones.

TABLE 2

|  | 1K mode | 2K mode | 4K mode | 8K mode | 16K mode | 32K mode |
|---|---|---|---|---|---|---|
| Number of subcarriers | 1024 | 2048 | 4096 | 8192 | 16384 | 32768 |
| Number of data tones | 853 | 1705 | 3409 | 6817 | 13633 | 27265 |
| Number of reserved tones | 9 | 18 | 36 | 72 | 144 | 288 |

Herein, the scattered pilots have a pattern similar to the structure shown in FIG. 7, and may have several modified patterns. For example, unlike the scattered pilots shown in FIG. 7, the scattered pilots can be designed at intervals of 12 subcarriers.

Next, reserved tones can be designed in consideration of the pilots based on the environment of Table 2, and the detailed reserved tone positions are as shown in Table 3.

TABLE 3

1k mode (9)

79, 306, 368, 392, 428, 674, 707, 748, 823

2k mode (18)

66, 125, 219, 326, 369, 606, 722, 729, 825, 938, 999, 1257, 1459, 1468, 1474, 1641, 1649, 1673

4k mode (36)

191, 260, 320, 475, 535, 599, 602, 620, 823, 826, 1185, 1197, 1334, 1358, 1435, 1481, 1496, 1586, 1627, 1678, 1913, 1979, 2042, 2074, 2162, 2322, 2351, 2371, 2584, 2699, 2777, 3018, 3031, 3125, 3307, 3341

8k mode (72)

101, 118, 172, 182, 317, 429, 551, 1158, 1247, 1359, 1424, 1442, 1456, 1551, 1660, 1709, 1791, 1798, 1947, 1961, 1965, 1976, 2069, 2091, 2128, 2342, 2420, 2492, 2551, 2552, 3082, 3135, 3175, 3391, 3427, 3671, 3812, 3824, 3837, 3856, 3898, 3903, 4097, 4203, 4226, 4242, 4258, 4331, 4487, 4532, 4578, 4667, 4805, 4854, 4862, 5140, 5168, 5216, 5239, 5561, 5588, 5603, 5768, 5791, 5966, 6347, 6458, 6462, 6519, 6592, 6706, 6801

16k mode (144)

5, 8, 15, 16, 18, 19, 45, 114, 118, 143, 225, 242, 307, 365, 366, 377, 383, 418, 477, 794, 869, 1065, 1131, 1148, 1288, 1310, 1363, 1365, 2159, 2222, 2288, 2311, 2369, 2385, 2442, 2693, 2816, 2860, 2899, 2919, 2930, 3101, 3270, 3299, 3657, 4156, 4510, 4720, 5025, 5068, 5320, 5570, 5633, 5695, 5774, 5824, 5840, 6294, 6429, 6500, 6749, 7112, 7191, 7229, 7402, 7505, 7630, 7643, 7676, 7694, 7715, 7747, 7806, 7863, 8138, 8241, 8595, 8711, 8781, 8813, 9015, 9103, 9136, 9262, 9294, 9304, 9315, 9320, 9404, 9422, 9690, 9750, 9807, 9810, 9873, 10074, 10221, 10490, 10551, 10602, 10623, 10670, 10699, 10766, 10917, 10982, 11074, 11142, 11310, 11322, 11403, 11411, 11601, 11670, 11692, 11723, 12115, 12116, 12125, 12338, 12365, 12412, 12477, 12513, 12608, 12616, 12647, 12698, 12748, 12826, 12914, 12945, 12986, 13157, 13180, 13198, 13288, 13375, 13378, 13450, 13533, 13541, 13578, 13603

32k mode (288)

101, 117, 174, 233, 353, 479, 527, 549, 658, 751, 915, 1005, 1029, 1077, 1089, 1363, 1408, 1419, 1422, 1432, 1523, 1587, 1593, 1699, 1870, 2031, 2358, 2512, 2542, 2714, 2874, 2914, 2932, 2998, 3074, 3088, 3207, 3446, 3462, 3618, 3620, 3716, 3767, 3881, 3899, 3914, 4156, 4172, 4432, 4484, 4490, 4627, 4655, 4845, 4961, 4982, 4984, 5058, 5406, 5457, 5536, 5651, 5726, 5735, 5781, 5831, 5915, 6058, 6095, 6127, 6281, 6441, 6502, 6626, 6742, 6870, 6940, 6958, 7737, 7781, 7794, 7858, 7876, 7891, 7989, 8070, 8086, 8234, 8270, 8285, 8416, 8420, 8798, 8829, 8837, 8985, 9245, 9251, 9629, 9671, 9815, 9863, 9968, 9969, 10014, 10384, 10407, 10450, 10482, 10545, 10580, 10631, 10769, 11380, 11407, 11654, 11719, 11804, 12236, 12260, 12280, 12323, 12331, 12351, 12426, 12524, 12561, 12667, 12750, 12907, 12958, 12980, 13073, 13096, 13406, 13492, 13677, 13709, 13828, 13913, 13948, 13967, 13996, 14214, 14234, 14282, 14300, 14370, 14495, 14642, 14686, 14956, 15016, 15366, 15467, 15508, 15525, 15537, 15917, 16035, 16106, 16147, 16354, 16434, 16491, 16559, 16587, 16708, 16724, 16763, 16799, 16949, 16987, 17163, 17176, 17215, 17255, 17296, 17354, 17630, 17698, 17778, 17779, 17786, 17923, 18190, 18259, 18378, 18546, 18635, 18667, 18790, 18819, 18935, 19059, 19315, 19367, 19396, 19582, 19653, 19674, 19802, 19827, 19895, 19917, 20123, 20130, 20182, 20566, 20780, 20806, 20827, 20834, 20848, 21026, 21057, 21082, 21092, 21230, 21402, 21476, 21570, 21610, 21834, 21862, 22005, 22019, 22162, 22217, 22360, 22640, 22707, 22882, 22929, 23063, 23186, 23253, 23309, 23395, 23399, 23442, 23445, 23564, 23571, 23795, 23851, 23883, 23931, 24309, 24362, 24374, 24403, 24424, 24447, 24574, 24758, 24880, 24921, 25187, 25216, 25371, 25426, 25487, 25509, 25567, 25593, 25611, 25790, 25798, 25814, 25841, 25894, 25930, 26126, 26167, 26169, 26239, 26276, 26277, 26512, 26559, 26572, 26654, 26756, 27091, 27116, 27247, 27251

The reserved tones in Table 3 each generate a signal having a shape of an impulse like Equation (7). Further, the reserved tone positions are designed so that a size of the remaining $p_1 \ldots p_{N-1}$ except for $p_0$ has a small value.

Another example of the above-stated reserved tones is as shown in Table 4. The following example shows positions of reserved tones designed in consideration of several types of scattered pilots and continual pilots, which are under discussion in DVB-T2.

TABLE 4

| FFT size (Number of reserved carriers) | Reserved Carrier Indices |
|---|---|
| 1K (10) | 109, 117, 122, 129, 139, 321, 350, 403, 459, 465 |
| 2K (18) | 250, 404, 638, 677, 700, 712, 755, 952, 1125, 1145, 1190, 1276, 1325, 1335, 1406, 1431, 1472, 1481 |
| 4K (36) | 170, 219, 405, 501, 597, 654, 661, 745, 995, 1025, 1319, 1361, 1394, 1623, 1658, 1913, 1961, 1971, 2106, 2117, 2222, 2228, 2246, 2254, 2361, 2468, 2469, 2482, 2637, 2679, 2708, 2825, 2915, 2996, 3033, 3119 |
| 8K (72) | 111, 115, 123, 215, 229, 392, 613, 658, 831, 842, 997, 1503, 1626, 1916, 1924, 1961, 2233, 2246, 2302, 2331, 2778, 2822, 2913, 2927, 2963, 2994, 3087, 3162, 3226, 3270, 3503, 3585, 3711, 3738, 3874, 3902, 4013, 4017, 4186, 4253, 4292, 4339, 4412, 4453, 4669, 4910, 5015, 5030, 5061, 5170, 5263, 5313, 5360, 5384, 5394, 5493, 5550, 5847, 5901, 5999, 6020, 6165, 6174, 6227, 6245, 6314, 6316, 6327, 6503, 6507, 6545, 6565 |
| 16K (144) | 109, 122, 139, 171, 213, 214, 251, 585, 763, 1012, 1021, 1077, 1148, 1472, 1792, 1883, 1889, 1895, 1900, 2013, 2311, 2582, 2860, 2980, 3011, 3099, 3143, 3171, 3197, 3243, 3257, 3270, 3315, 3436, 3470, 3582, 3681, 3712, 3767, 3802, 3979, 4045, 4112, 4197, 4409, 4462, 4756, 5003, 5007, 5036, 5246, 5483, 5535, 5584, 5787, 5789, 6047, 6349, 6392, 6498, 6526, 6542, 6591, 6680, 6688, 6785, 6860, 7134, 7286, 7387, 7415, 7417, 7505, 7526, 7541, 7551, 7556, 7747, 7814, 7861, 7880, 8045, 8179, 8374, 8451, 8514, 8684, 8698, 8804, 8924, 9027, 9113, 9211, 9330, 9479, 9482, 9487, 9619, 9829, 10326, 10394, 10407, 10450, 10528, 10671, 10746, 10774, 10799, 10801, 10912, 11113, 11128, 11205, 11379, 11459, 11468, 11658, 11776, 11791, 11953, 11959, 12021, 12028, 12135, 12233, 12407, 12441, 12448, 12470, 12501, 12548, 12642, 12679, 12770, 12788, 12899, 12923, 12939, 13050, 13103, 13147, 13256, 13339, 13409 |
| 32K (288) | 164, 320, 350, 521, 527, 578, 590, 619, 635, 651, 662, 664, 676, 691, 723, 940, 1280, 1326, 1509, 1520, 1638, 1682, 1805, 1833, 1861, 1891, 1900, 1902, 1949, 1967, 1978, 1998, 2006, 2087, 2134, 2165, 2212, 2427, 2475, 2555, 2874, 3067, 3091, 3101, 3146, 3188, 3322, 3353, 3383, 3503, 3523, 3654, 3856, 4150, 4158, 4159, 4174, 4206, 4318, 4417, 4629, 4631, 4875, 5104, 5106, 5111, 5131, 5145, 5146, 5177, 5181, 5246, 5269, 5458, 5474, 5500, 5509, 5579, 5810, 5823, 6058, 6066, 6098, 6411, 6741, 6775, 6932, 7103, 7258, 7303, 7413, 7586, 7591, 7634, 7636, 7655, 7671, 7675, 7756, 7760, 7826, 7931, 7937, 7951, 8017, 8061, 8071, 8117, 8317, 8321, 8353, 8806, 9010, 9237, 9427, 9453, 9469, 9525, 9558, 9574, 9584, 9820, 9973, 10011, 10043, 10064, 10066, 10081, 10136, 10193, 10249, 10511, 10537, 11083, 11350, 11369, 11428, 11622, 11720, 11924, 11974, 11979, 12944, 12945, 13009, 13070, 13110, 13257, 13364, 13370, 13449, 13503, 13514, 13520, 13583, 13593, 13708, 13925, 14192, 14228, 14235, 14279, 14284, 14370, 14393, 14407, 14422, 14471, 14494, 14536, 14617, 14829, 14915, 15094, 15138, 15155, 15170, 15260, 15283, 15435, 15594, 15634, 15810, 16178, 16192, 16196, 16297, 16366, 16498, 16501, 16861, 16966, 17039, 17057, 17240, 17523, 17767, 18094, 18130, 18218, 18344, 18374, 18657, 18679, 18746, 18772, 18779, 18786, 18874, 18884, 18955, 19143, 19497, 19534, 19679, 19729, 19738, 19751, 19910, 19913, 20144, 20188, 20194, 20359, 20490, 20500, 20555, 20594, 20633, 20656, 21099, 21115, 21597, 22139, 22208, 22244, 22530, 22547, 22562, 22567, 22696, 22757, 22798, 22854, 22877, 23068, 23102, 23141, 23154, 23170, 23202, 23368, 23864, 24057, 24215, 24219, 24257, 24271, 24325, 24447, 25137, 25590, 25702, 25706, 25744, 25763, 25811, 25842, 25853, 25954, 26079, 26158, 26285, 26346, 26488, 26598, 26812, 26845, 26852, 26869, 26898, 26909, 26927, 26931, 26946, 26975, 26991, 27039 |

Table 4 shows reserved tone positions designed in consideration of scattered pilots and continual pilots of the DVB system. In the DVB system, the scattered pilots have 8 patterns shown in Table 5. The scattered pilot pattern is determined according to a subcarrier spacing (x) of the pilot pattern, and the number (y) of OFDM symbols for spacing the scattered pilots.

In other words, (x) means the number of sub-carriers in two consecutive symbols, (y) means the number of symbols return to the same scattered pilot form.

TABLE 5

| Pilot pattern | Subcarrier spacing (x) | Number (y) of OFDM symbols |
|---|---|---|
| PP1 | 3 | 4 |
| PP2 | 6 | 2 |
| PP3 | 6 | 4 |
| PP4 | 12 | 2 |
| PP5 | 12 | 4 |
| PP6 | 24 | 2 |
| PP7 | 24 | 4 |
| PP8 | 6 | 16 |

In Table 5, a scattered pilot pattern #1 PP1 represents the scattered pilot pattern of FIG. 2. As stated above, the reserved tone positions of Table 4 are shifted during y OFDM symbols at intervals of x subcarriers according to the scattered pilot pattern.

Equation (9) expresses reserved tone positions based on the scattered pilot pattern.

$$S_l = \{i_k + x*(l \bmod y) | i_k \in S_0, 0 \leq k < N_{RT}, 0 \leq l < D_L\} \quad (9)$$

In Equation (9), $S_0$ denotes the reserved tone positions of Table 4, $N_{RT}$ denotes the number of reserved tones, and $D_L$ denotes the number of data symbols.

Figure 8:
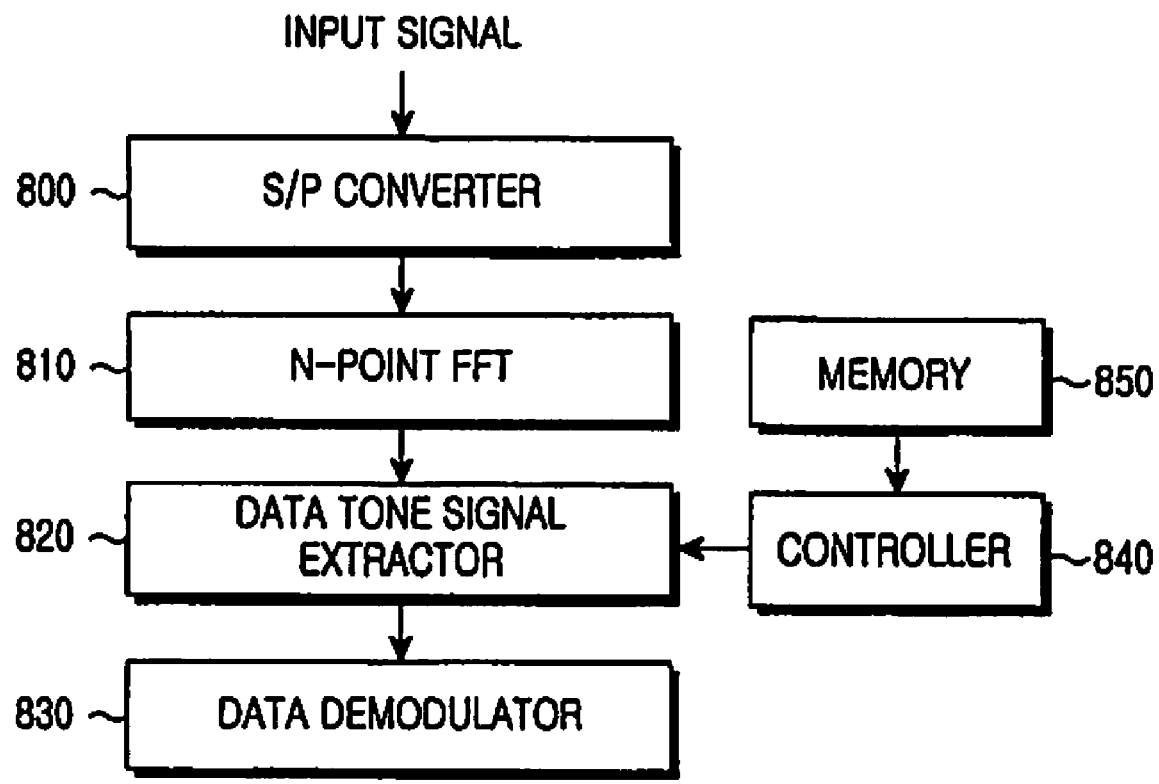
FIG. 8 is a block diagram illustrating a structure of a TR-based reception apparatus according to an embodiment of the present invention.

With reference to FIG. 8, a reception apparatus corresponding to the transmission apparatus will now be described.

Referring to FIG. 8, time-domain received signals corresponding to one OFDM symbol are input to a Serial-to-Parallel (S/P) converter 800. Then the S/P converter 800 parallel-converts the input time-domain received signals, and outputs the parallel signals to an N-point FFT unit 810. The N-point FFT unit 810 performs FFT on the parallel input signals to convert the time-domain signals into frequency-domain signals. The FFT-transformed signals are input to a data tone signal extractor 820.

A memory 850 outputs reserved tone positions previously stored therein, and the output reserved tone positions are input to a controller 840.

The memory 850, like the memory 560 in the transmission apparatus, stores therein the number of reserved tones allocated one symbol and the frequency-domain reserved tone positions based on the OFDM size, as shown in Table 4, i.e., as the memory 850 stores therein a reserved tone position pattern allocated to one predetermined symbol in the frequency domain, rather than storing position information of different frequency-domain reserved tones for every symbol, the one reserved tone position pattern is applied to every symbol.

Then the controller 840 adjusts the input reserved tone positions according to the pilot tone positions in an OFDM symbol received at the receiver using the method of the present invention so that the reserved tone positions do not collide, and then outputs the adjusted reserved tone positions to the data tone signal extractor 820.

In other words, the controller 840, like the controller 570 in the transmission apparatus, detects a subcarrier spacing interval of a scattered pilot pattern and the number of symbols, and determines shifted reserved tone positions by shifting predetermined reserved tone positions shown in Table 4 by the subcarrier's spacing interval during the number of symbols. The shifted reserved tone positions can be calculated using Equation (9).

Then the data tone signal extractor 820 extracts signals of the remaining positions, except for the reserved tone positions received from the controller 840 among the frequency-domain signals received from the FFT unit 810, i.e., extracts signals of data tone positions. The signals output from the data tone signal extractor 820 are input to a data demodulator 830 where the input signals undergo data demodulation.

Figure 9:
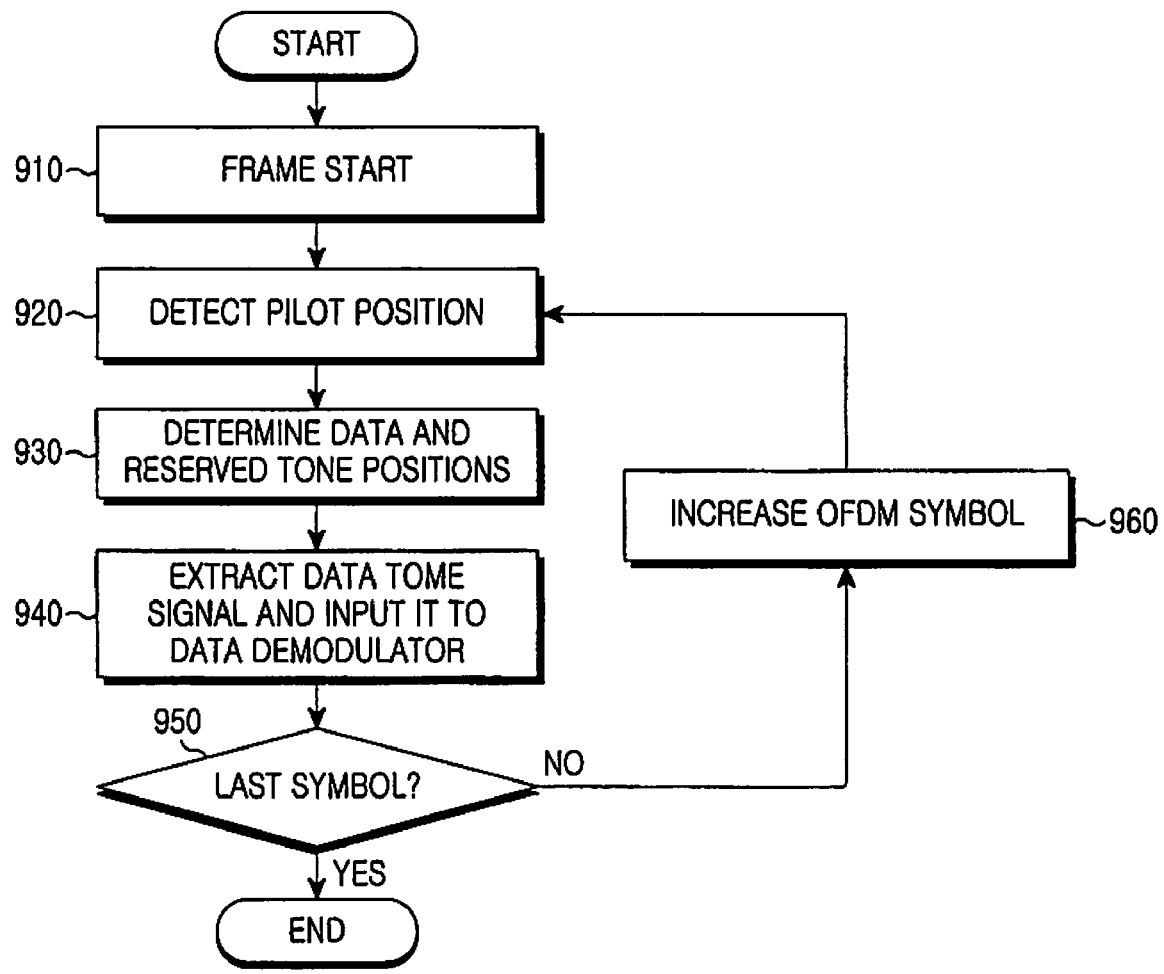
FIG. 9 is a flowchart illustrating a reception operation of the reception apparatus according to an embodiment of the present invention.

With reference to FIG. 9, a reception operation of the reception apparatus will now be described.

Referring to FIG. 9, as a frame starts in step 910, a receiver detects pilot positions for every OFDM symbol in step 920. In step 930, the receiver determines data and reserved tone positions using the detected pilot positions. In the process of determining the data and reserved tone positions, the receiver calculates a subcarrier shift value for preventing the pilot positions from overlapping the reserved tone positions, and determines the data and reserved tone positions based on the determined shift value.

Thereafter, in step 940, the receiver extracts data signals transmitted in the positions except for the reserved tone positions using the determined tone positions, and inputs the extracted data signals to a data demodulator for demodulation thereof. After the reception operation, the receiver repeats the above processing process on the next OFDM symbol.

In other words, the receiver determines in step 950 whether the receiver has performed the reception process through the last OFDM symbol in the frame. If it is determined that the receiver has performed the reception process on up to the last OFDM symbol, the receiver ends all the process. However, if it is determined in step 950 that the corresponding OFDM symbol is not the last OFDM symbol in the frame, the receiver increases the OFDM symbol index in step 960, and then returns to step 920.

Although the operation includes herein a series of processes of detecting pilot positions in step 920 and determining reserved tone positions and data tone positions, which are collision-free with the pilot positions, in step 930, for a better understanding of the present invention, the determination of the reserved tone and data tone positions in step 930 may be implemented by a method of previously storing the reserved tone and data tone positions in a memory for each OFDM symbol.

As is apparent from the foregoing description, the present invention can solve the problem that reserved tone positions collide with pilot positions as the pilot positions are different for every OFDM symbol according to the frame structure, and can circular-shift even the reserved tone positions in the same way as it circular-shifts the pilot positions, thereby solving the collision problem between the reserved tones and the pilots.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for reducing a Peak to Average Power Ratio (PAPR) using a reserved tone set in a transmission apparatus of an Orthogonal Frequency Division Multiplexing (OFDM) communication system, the method comprising:
    determining a shift value based on a subcarrier spacing interval (x) and a number of spaced symbols (y) of a scattered pilot pattern;
    determining the reserved tone set ($S_i$) for OFDM symbols by shifting each of subcarriers ($i_k$) of a predetermined reserved tone set ($S_0$) by the determined shift value;
    determining an impulse waveform obtained by rotating a phase of a complex value of an impulse stored in a memory, using the reserved tone set;
    calculating a subtrahend for a PAPR of an output signal using the phase-rotated impulse waveform; and
    reducing a PAPR of an input signal by performing a gradient algorithm using the phase-rotated impulse waveform.

2. The method of claim 1, wherein the predetermined reserved tone set ($S_0$) is shown in the following table:

| FFT size (Number of reserved carriers) | Reserved Tones |
|---|---|
| 1K (10) | 109, 117, 122, 129, 139, 321, 350, 403, 459, 465 |
| 2K (18) | 250, 404, 638, 677, 700, 712, 755, 952, 1125, 1145, 1190, 1276, 1325, 1335, 1406, 1431, 1472, 1481 |
| 4K (36) | 170, 219, 405, 501, 597, 654, 661, 745, 995, 1025, 1319, 1361, 1394, 1623, 1658, 1913, 1961, 1971, 2106, 2117, 2222, 2228, 2246, 2254, 2361, 2468, 2469, 2482, 2637, 2679, 2708, 2825, 2915, 2996, 3033, 3119 |
| 8K (72) | 111, 115, 123, 215, 229, 392, 613, 658, 831, 842, 997, 1503, 1626, 1916, 1924, 1961, 2233, 2246, 2302, 2331, 2778, 2822, 2913, 2927, 2963, 2994, 3087, 3162, 3226, 3270, 3503, 3585, 3711, 3738, 3874, 3902, 4013, 4017, 4186, 4253, 4292, 4339, 4412, 4453, 4669, 4910, 5015, 5030, 5061, 5170, 5263, 5313, 5360, 5384, 5394, 5493, 5550, 5847, 5901, 5999, 6020, 6165, 6174, 6227, 6245, 6314, 6316, 6327, 6503, 6507, 6545, 6565 |
| 16K (144) | 109, 122, 139, 171, 213, 214, 251, 585, 763, 1012, 1021, 1077, 1148, 1472, 1792, 1883, 1889, 1895, 1900, 2013, 2311, 2582, 2860, 2980, 3011, 3099, 3143, 3171, 3197, 3243, 3257, 3270, 3315, 3436, 3470, 3582, 3681, 3712, 3767, 3802, 3979, 4045, 4112, 4197, 4409, 4462, 4756, 5003, 5007, 5036, 5246, 5483, 5535, 5584, 5787, 5789, 6047, 6349, 6392, 6498, 6526, 6542, 6591, 6680, 6688, 6785, 6860, 7134, 7286, 7387, 7415, 7417, 7505, 7526, 7541, 7551, 7556, 7747, 7814, 7861, 7880, 8045, 8179, 8374, 8451, 8514, 8684, 8698, 8804, 8924, 9027, 9113, 9211, 9330, 9479, 9482, 9487, 9619, 9829, 10326, 10394, 10407, 10450, 10528, 10671, 10746, 10774, 10799, 10801, 10912, 11113, 11128, 11205, 11379, 11459, 11468, 11658, 11776, 11791, 11953, 11959, 12021, 12028, 12135, 12233, 12407, 12441, 12448, 12470, 12501, 12548, 12642, 12679, 12770, 12788, 12899, 12923, 12939, 13050, 13103, 13147, 13256, 13339, 13409 |
| 32K (288) | 164, 320, 350, 521, 527, 578, 590, 619, 635, 651, 662, 664, 676, 691, 723, 940, 1280, 1326, 1509, 1520, 1638, 1682, 1805, 1833, 1861, 1891, 1900, 1902, 1949, 1967, 1978, 1998, 2006, 2087, 2134, 2165, 2212, 2427, 2475, 2555, 2874, 3067, 3091, 3101, 3146, 3188, 3322, 3353, 3383, 3503, 3523, 3654, 3856, 4150, 4158, 4159, 4174, 4206, 4318, 4417, 4629, 4631, 4875, 5104, 5106, 5111, 5131, 5145, 5146, 5177, 5181, 5246, 5269, 5458, 5474, 5500, 5509, 5579, 5810, 5823, 6058, 6066, 6098, 6411, 6741, 6775, 6932, 7103, 7258, 7303, 7413, 7586, 7591, 7634, 7636, 7655, 7671, 7675, 7756, 7760, 7826, 7931, 7937, 7951, 8017, 8061, 8071, 8117, 8317, 8321, 8353, 8806, 9010, 9237, 9427, 9453, 9469, 9525, 9558, 9574, 9584, 9820, 9973, 10011, 10043, 10064, 10066, 10081, 10136, 10193, 10249, 10511, 10537, 11083, 11350, 11369, 11428, 11622, 11720, 11924, 11974, 11979, 12944, 12945, 13009, 13070, 13110, 13257, 13364, 13370, 13449, 13503, 13514, 13520, 13583, 13593, 13708, 13925, 14192, 14228, 14235, 14279, 14284, 14370, 14393, 14407, 14422, 14471, 14494, 14536, 14617, 14829, 14915, 15094, 15138, 15155, 15170, 15260, 15283, 15435, 15594, 15634, 15810, 16178, 16192, 16196, 16297, 16366, 16498, 16501, 16861, 16966, 17039, 17057, 17240, 17523, 17767, 18094, 18130, 18218, 18344, 18374, 18657, 18679, 18746, 18772, 18779, 18786, 18874, 18884, 18955, 19143, 19497, 19534, 19679, 19729, 19738, 19751, 19910, 19913, 20144, 20188, 20194, 20359, 20490, 20500, 20555, 20594, 20633, 20656, 21099, 21115, 21597, 22139, 22208, 22244, 22530, 22547, 22562, 22567, 22696, 22757, 22798, 22854, 22877, 23068, 23102, 23141, 23154, 23170, 23202, 23368, 23864, 24057, 24215, 24219, 24257, 24271, 24325, 24447, 25137, 25590, 25702, 25706, 25744, 25763, 25811, 25842, 25853, 25954, 26079, 26158, 26285, 26346, |

-continued

| FFT size (Number of reserved carriers) | Reserved Tones |
|---|---|
| | 26488, 26598, 26812, 26845, 26852, 26869, 26898, 26909, 26927, 26931, 26946, 26975, 26991, 27039. |

3. The method of claim 1, wherein the reserved tone set ($S_i$) is determined using:

$$S_i = \{i_k + x*(l \bmod y) | i_k \in S_0, 0 \leq l < D_L\}$$

where $D_L$ denotes a number of the OFDM symbols.

4. A transmission apparatus for reducing a Peak to Average Power Ratio (PAPR) using a reserved tone set in an Orthogonal Frequency Division Multiplexing (OFDM) communication system, the apparatus comprising:
  a memory for storing the reserved tone set ($S_i$) for OFDM symbols and an impulse waveform based on the reserved tone set;
  a controller for determining a shift value based on a subcarrier spacing interval (x) and a number of spaced symbols (y) of a scattered pilot pattern, determining the reserved tone set ($S_i$) by shifting each of subcarriers ($i_k$) of a predetermined reserved tone set ($S_0$) by the determined shift value, and determining a new impulse waveform generated by rotating a phase of a complex value according to the reserved tone set;
  a tone reservation unit for reserving data, pilots, and the reserved tones in a subcarrier position for every symbol according to a control signal from the controller; and
  a gradient algorithm unit for calculating a subtrahend for a PAPR using an updated impulse waveform received from the controller, and adding the calculated subtrahend for the PAPR to an input signal.

5. The transmission apparatus of claim 4, wherein the predetermined reserved tone set ($S_0$) is in the following table:

| FFT size (Number of reserved carriers) | Reserved Tones |
|---|---|
| 1K (10) | 109, 117, 122, 129, 139, 321, 350, 403, 459, 465 |
| 2K (18) | 250, 404, 638, 677, 700, 712, 755, 952, 1125, 1145, 1190, 1276, 1325, 1335, 1406, 1431, 1472, 1481 |
| 4K (36) | 170, 219, 405, 501, 597, 654, 661, 745, 995, 1025, 1319, 1361, 1394, 1623, 1658, 1913, 1961, 1971, 2106, 2117, 2222, 2228, 2246, 2254, 2361, 2468, 2469, 2482, 2637, 2679, 2708, 2825, 2915, 2996, 3033, 3119 |
| 8K (72) | 111, 115, 123, 215, 229, 392, 613, 658, 831, 842, 997, 1503, 1626, 1916, 1924, 1961, 2233, 2246, 2302, 2331, 2778, 2822, 2913, 2927, 2963, 2994, 3087, 3162, 3226, 3270, 3503, 3585, 3711, 3738, 3874, 3902, 4013, 4017, 4186, 4253, 4292, 4339, 4412, 4453, 4669, 4910, 5015, 5030, 5061, 5170, 5263, 5313, 5360, 5384, 5394, 5493, 5550, 5847, 5901, 5999, 6020, 6165, 6174, 6227, 6245, 6314, 6316, 6327, 6503, 6507, 6545, 6565 |
| 16K (144) | 109, 122, 139, 171, 213, 214, 251, 585, 763, 1012, 1021, 1077, 1148, 1472, 1792, 1883, 1889, 1895, 1900, 2013, 2311, 2582, 2860, 2980, 3011, 3099, 3143, 3171, 3197, 3243, 3257, 3270, 3315, 3436, 3470, 3582, 3681, 3712, 3767, 3802, 3979, 4045, 4112, 4197, 4409, 4462, 4756, 5003, 5007, 5036, 5246, 5483, 5535, 5584, 5787, 5789, 6047, 6349, 6392, 6498, 6526, 6542, 6591, 6680, 6688, 6785, 6860, 7134, 7286, 7387, 7415, 7417, 7505, 7526, 7541, 7551, 7556, 7747, 7814, 7861, 7880, 8045, 8179, 8374, 8451, 8514, 8684, 8698, 8804, 8924, 9027, 9113, 9211, 9330, 9479, 9482, 9487, 9619, 9829, 10326, 10394, 10407, 10450, 10528, 10671, 10746, 10774, 10799, 10801, 10912, 11113, 11128, 11205, 11379, 11459, 11468, 11658, 11776, 11791, 11953, 11959, 12021, 12028, 12135, 12233, 12407, 12441, 12448, 12470, 12501, 12548, 12642, 12679, 12770, 12788, 12899, 12923, 12939, 13050, 13103, 13147, 13256, 13339, 13409 |
| 32K (288) | 164, 320, 350, 521, 527, 578, 590, 619, 635, 651, 662, 664, 676, 691, 723, 940, 1280, 1326, 1509, 1520, 1638, 1682, 1805, 1833, 1861, 1891, 1900, 1902, 1949, 1967, 1978, 1998, 2006, 2087, 2134, 2165, 2212, 2427, 2475, 2555, 2874, 3067, 3091, 3101, 3146, 3188, 3322, 3353, 3383, 3503, 3523, 3654, 3856, 4150, 4158, 4159, 4174, 4206, 4318, 4417, 4629, 4631, 4875, 5104, 5106, 5111, 5131, 5145, 5146, 5177, 5181, 5246, 5269, 5458, 5474, 5500, 5509, 5579, 5810, 5823, 6058, 6066, 6098, 6411, 6741, 6775, 6932, 7103, 7258, 7303, 7413, 7586, 7591, 7634, 7636, 7655, 7671, 7675, 7756, 7760, 7826, 7931, 7937, 7951, 8017, 8061, 8071, 8117, 8317, 8321, 8353, 8806, 9010, 9237, 9427, 9453, 9469, 9525, 9558, 9574, 9584, 9820, 9973, 10011, 10043, 10064, 10066, 10081, 10136, 10193, 10249, 10511, 10537, 11083, 11350, 11369, 11428, 11622, 11720, 11924, 11974, 11979, 12944, 12945, 13009, 13070, 13110, 13257, 13364, 13370, 13449, 13503, 13514, 13520, 13583, 13593, 13708, 13925, 14192, 14228, 14235, 14279, 14284, 14370, 14393, 14407, 14422, 14471, 14494, 14536, 14617, 14829, 14915, 15094, 15138, 15155, 15170, 15260, 15283, 15435, 15594, 15634, 15810, 16178, 16192, 16196, 16297, 16366, 16498, 16501, 16861, 16966, 17039, 17057, 17240, 17523, 17767, 18094, 18130, 18218, 18344, 18374, 18657, 18679, 18746, 18772, 18779, 18786, 18874, 18884, 18955, 19143, 19497, 19534, 19679, 19729, 19738, 19751, 19910, 19913, 20144, 20188, 20194, 20359, 20490, 20500, 20555, 20594, 20633, 20656, 21099, 21115, 21597, 22139, 22208, 22244, 22530, 22547, 22562, 22567, 22696, 22757, 22798, 22854, 22877, 23068, 23102, 23141, 23154, 23170, 23202, 23368, 23864, 24057, 24215, 24219, 24257, 24271, 24325, 24447, 25137, 25590, 25702, 25706, 25744, 25763, 25811, 25842, 25853, 25954, 26079, 26158, 26285, 26346, 26488, 26598, 26812, 26845, 26852, 26869, 26898, 26909, 26927, 26931, 26946, 26975, 26991, 27039. |

6. The transmission apparatus of claim 4, wherein the controller determines the reserved tone set ($S_i$) using:

$$S_i = \{i_k + x*(l \bmod y) | i_k \in S_0, 0 \leq l < D_L\},$$

where $D_L$ denotes a number of the OFDM symbols.

7. A method for reducing a Peak to Average Power Ratio (PAPR) using a reserved tone set in a reception apparatus of an Orthogonal Frequency Division Multiplexing (OFDM) communication system, the method comprising:
  determining a shift value based on a subcarrier spacing interval (x) and a number of spaced symbols (y) of a scattered pilot pattern;
  determining the reserved tone set ($S_i$) for OFDM symbols by shifting each of subcarriers ($i_k$) of a predetermined reserved tone set ($S_0$) by the determined shift value;
  extracting data signals transmitted in tones except for reserved tones in every symbol using the reserved tone set ($S_i$); and
  performing a demodulation on the extracted data signals.

8. The method of claim 7, wherein the predetermined reserved tone set ($S_0$) is shown in the following table:

| FFT size (Number of reserved carriers) | Reserved Tones |
|---|---|
| 1K (10) | 109, 117, 122, 129, 139, 321, 350, 403, 459, 465 |
| 2K (18) | 250, 404, 638, 677, 700, 712, 755, 952, 1125, 1145, 1190, 1276, 1325, 1335, 1406, 1431, 1472, 1481 |
| 4K (36) | 170, 219, 405, 501, 597, 654, 661, 745, 995, 1025, 1319, 1361, 1394, 1623, 1658, 1913, 1961, 1971, 2106, 2117, 2222, 2228, 2246, 2254, 2361, 2468, 2469, 2482, 2637, 2679, 2708, 2825, 2915, 2996, 3033, 3119 |
| 8K (72) | 111, 115, 123, 215, 229, 392, 613, 658, 831, 842, 997, 1503, 1626, 1916, 1924, 1961, 2233, 2246, 2302, 2331, 2778, 2822, 2913, 2927, 2963, 2994, 3087, 3162, 3226, 3270, 3503, 3585, 3711, 3738, 3874, 3902, 4013, 4017, 4186, 4253, 4292, 4339, 4412, 4453, 4669, 4910, 5015, 5030, 5061, 5170, 5263, 5313, 5360, 5384, 5394, 5493, 5550, 5847, 5901, 5999, 6020, 6165, 6174, 6227, 6245, 6314, 6316, 6327, 6503, 6507, 6545, 6565 |
| 16K (144) | 109, 122, 139, 171, 213, 214, 251, 585, 763, 1012, 1021, 1077, 1148, 1472, 1792, 1883, 1889, 1895, 1900, 2013, 2311, 2582, 2860, 2980, 3011, 3099, 3143, 3171, 3197, 3243, 3257, 3270, 3315, 3436, 3470, 3582, 3681, 3712, 3767, 3802, 3979, 4045, 4112, 4197, 4409, 4462, 4756, 5003, 5007, 5036, 5246, 5483, 5535, 5584, 5787, 5789, 6047, 6349, 6392, 6498, 6526, 6542, 6591, 6680, 6688, 6785, 6860, 7134, 7286, 7387, 7415, 7417, 7505, 7526, 7541, 7551, 7556, 7747, 7814, 7861, 7880, 8045, 8179, 8374, 8451, 8514, 8684, 8698, 8804, 8924, 9027, 9113, 9211, 9330, 9479, 9482, 9487, 9619, 9829, 10326, 10394, 10407, 10450, 10528, 10671, 10746, 10774, 10799, 10801, 10912, 11113, 11128, 11205, 11379, 11459, 11468, 11658, 11776, 11791, 11953, 11959, 12021, 12028, 12135, 12233, 12407, 12441, 12448, 12470, 12501, 12548, 12642, 12679, 12770, 12788, 12899, 12923, 12939, 13050, 13103, 13147, 13256, 13339, 13409 |
| 32K (288) | 164, 320, 350, 521, 527, 578, 590, 619, 635, 651, 662, 664, 676, 691, 723, 940, 1280, 1326, 1509, 1520, 1638, 1682, 1805, 1833, 1861, 1891, 1900, 1902, 1949, 1967, 1978, 1998, 2006, 2087, 2134, 2165, 2212, 2427, 2475, 2555, 2874, 3067, 3091, 3101, 3146, 3188, 3322, 3353, 3383, 3503, 3523, 3654, 3856, 4150, 4158, 4159, 4174, 4206, 4318, 4417, 4629, 4631, 4875, 5104, 5106, 5111, 5131, 5145, 5146, 5177, 5181, 5246, 5269, 5458, 5474, 5500, 5509, 5579, 5810, 5823, 6058, 6066, 6098, 6411, 6741, 6775, 6932, 7103, 7258, 7303, 7413, 7586, 7591, 7634, 7636, 7655, 7671, 7675, 7756, 7760, 7826, 7931, 7937, 7951, 8017, 8061, 8071, 8117, 8317, 8321, 8353, 8806, 9010, 9237, 9427, 9453, 9469, 9525, 9558, 9574, 9584, 9820, 9973, 10011, 10043, 10064, 10066, 10081, 10136, 10193, 10249, 10511, 10537, 11083, 11350, 11369, 11428, 11622, 11720, 11924, 11974, 11979, 12944, 12945, 13009, 13070, 13110, 13257, 13364, 13370, 13449, 13503, 13514, 13520, 13583, 13593, 13708, 13925, 14192, 14228, 14235, 14279, 14284, 14370, 14393, 14407, 14422, 14471, 14494, 14536, 14617, 14829, 14915, 15094, 15138, 15155, 15170, 15260, 15283, 15435, 15594, 15634, 15810, 16178, 16192, 16196, 16297, 16366, 16498, 16501, 16861, 16966, 17039, 17057, 17240, 17523, 17767, 17804, 18130, 18218, 18344, 18374, 18657, 18679, 18746, 18772, 18779, 18786, 18874, 18884, 18955, 19143, 19497, 19534, 19679, 19729, 19738, 19751, 19910, 19913, 20144, 20188, 20194, 20359, 20490, 20500, 20555, 20594, 20633, 20656, 21099, 21115, 21597, 22139, 22208, 22244, 22530, 22547, 22562, 22567, 22696, 22757, 22798, 22854, 22877, 23068, 23102, 23141, 23154, 23170, 23202, 23368, 23864, 24057, 24215, 24219, 24257, 24271, 24325, 24447, 25137, 25590, 25702, 25706, 25744, 25763, 25811, 25842, 25853, 25954, 26079, 26158, 26285, 26346, 26488, 26598, 26812, 26845, 26852, 26869, 26898, 26909, 26927, 26931, 26946, 26975, 26991, 27039. |

9. The method of claim 7, wherein the reserved tone set ($S_i$) is determined using:

$$S_i = \{i_k + x*(l \bmod y) | i_k \in S_0, 0 \leq l < D_L\},$$

where $D_L$ denotes a number of the OFDM symbols.

10. A reception apparatus for reducing a Peak to Average Power Ratio (PAPR) using a reserved tone set an Orthogonal Frequency Division Multiplexing (OFDM) communication system, the apparatus comprising:

a memory for storing the reserved tone set ($S_i$) for OFDM symbols;

a controller for determining a shift value based on a subcarrier spacing interval (x) and a number of spaced symbols (y) of a scattered pilot pattern, and determining the reserved tone set ($S_i$) by shifting each of subcarriers ($i_k$) of a predetermined reserved tone set ($S_0$) by the determined shift value;

a data tone signal extractor for extracting data signals transmitted in tones except for reserved tones in every symbol using the reserved tone set ($S_i$) received from the controller; and a data demodulator for performing demodulation on signals output from the data tone signal extractor.

11. The reception apparatus of claim 10, wherein the predetermined reserved tone set ($S_0$) is in the following table:

| FFT size (Number of reserved carriers) | Reserved Tones |
|---|---|
| 1K (10) | 109, 117, 122, 129, 139, 321, 350, 403, 459, 465 |
| 2K (18) | 250, 404, 638, 677, 700, 712, 755, 952, 1125, 1145, 1190, 1276, 1325, 1335, 1406, 1431, 1472, 1481 |
| 4K (36) | 170, 219, 405, 501, 597, 654, 661, 745, 995, 1025, 1319, 11361, 1394, 1623, 1658, 1913, 961, 1971, 2106, 2117, 2222, 2228, 2246, 2254, 2361, 2468, 2469, 2482, 2637, 2679, 2708, 2825, 2915, 2996, 3033, 3119 |
| 8K (72) | 111, 115, 123, 215, 229, 392, 613, 658, 831, 842, 997, 1503, 1626, 1916, 1924, 1961, 2233, 2246, 2302, 2331, 2778, 2822, 2913, 2927, 2963, 2994, 3087, 3162, 3226, 3270, 3503, 3585, 3711, 3738, 3874, 3902, 4013, 4017, 4186, 4253, 4292, 4339, 4412, 4453, 4669, 4910, 5015, 5030, 5061, 5170, 5263, 5313, 5360, 5384, 5394, 5493, 5550, 5847, 5901, 5999, 6020, 6165, 6174, 6227, 6245, 6314, 6316, 6327, 6503, 6507, 6545, 6565 |
| 16K (144) | 109, 122, 139, 171, 213, 214, 251, 585, 763, 1012, 1021, 1077, 1148, 1472, 1792, 1883, 1889, 1895, 1900, 2013, 2311, 2582, 2860, 2980, 3011, 3099, 3143, 3171, 3197, 3243, 3257, 3270, 3315, 3436, 3470, 3582, 3681, 3712, 3767, 3802, 3979, 4045, 4112, 4197, 4409, 4462, 4756, 5003, 5007, 5036, 5246, 5483, 5535, 5584, 5787, 5789, 6047, 6349, 6392, 6498, 6526, 6542, 6591, 6680, 6688, 6785, 6860, 7134, 7286, 7387, 7415, 7417, 7505, 7526, 7541, 7551, 7556, 7747, 7814, 7861, 7880, 8045, 8179, 8374, 8451, 8514, 8684, 8698, 8804, 8924, 9027, 9113, 9211, 9330, 9479, 9482, 9487, 9619, 9829, 10326, 10394, 10407, 10450, 10528, 10671, 10746, 10774, 10799, 10801, 10912, 11113, 11128, 11205, 11379, 11459, 11468, 11658, 11776, 11791, 11953, 11959, 12021, 12028, 12135, 12233, 12407, 12441, 12448, 12470, 12501, 12548, 12642, 12679, 12770, 12788, 12899, 12923, 12939, 13050, 13103, 13147, 13256, 13339, 13409 |
| 32K (288) | 164, 320, 350, 521, 527, 578, 590, 619, 635, 651, 662, 664, 676, 691, 723, 940, 1280, 1326, 1509, 1520, 1638, 1682, 1805, 1833, 1861, 1891, 1900, 1902, 1949, 1967, 1978, 1998, 2006, 2087, 2134, 2165, 2212, 2427, 2475, 2555, 2874, 3067, 3091, 3101, 3146, 3188, 3322, 3353, 3383, 3503, 3523, 3654, 3856, 4150, 4158, 4159, 4174, 4206, 4318, 4417, 4629, 4631, 4875, 5104, 5106, 5111, 5131, 5145, 5146, 5177, 5181, 5246, 5269, 5458, 5474, 5500, 5509, 5579, 5810, 5823, 6058, 6066, 6098, 6411, 6741, 6775, 6932, 7103, 7258, 7303, 7413, 7586, 7591, 7634, 7636, 7655, 7671, 7675, 7756, 7760, 7826, 7931, 7937, 7951, 8017, 8061, 8071, 8117, 8317, 8321, 8353, 8806, 9010, 9237, 9427, 9453, 9469, 9525, 9558, 9574, 9584, 9820, 9973, 10011, 10043, 10064, 10066, 10081, 10136, 10193, 10249, 10511, 10537, 11083, 11350, 11369, 11428, 11622, 11720, 11924, 11974, 11979, 12944, 12945, 13009, 13070, 13110, 13257, 13364, 13370, 13449, 13503, 13514, 13520, 13583, 13593, 13708, 13925, 14192, 14228, 14235, 14279, 14284, 14370, 14393, 14407, 14422, 14471, 14494, 14536, 14617, 14829, 14915, 15094, 15138, 15155, 15170, 15260, 15283, 15435, 15594, 15634, 15810, 16178, 16192, 16196, 16297, 16366, 16498, 16501, 16861, 16966, 17039, 17057, |

-continued

| FFT size (Number of reserved carriers) | Reserved Tones |
|---|---|
| | 17240, 17523, 17767, 18094, 18130, 18218, 18344, 18374, 18657, 18679, 18746, 18772, 18779, 18786, 18874, 18884, 18955, 19143, 19497, 19534, 19679, 19729, 19738, 19751, 19910, 19913, 20144, 20188, 20194, 20359, 20490, 20500, 20555, 20594, 20633, 20656, 21099, 21115, 21597, 22139, 22208, 22244, 22530, 22547, 22562, 22567, 22696, 22757, 22798, 22854, 22877, 23068, 23102, 23141, 23154, 23170, 23202, 23368, 23864, 24057, 24215, 24219, 24257, 24271, 24325, 24447, 25137, 25590, 25702, 25706, 25744, 25763, 25811, 25842, 25853, 25954, 26079, 26158, 26285, 26346, 26488, 26598, 26812, 26845, 26852, 26869, 26898, 26909, 26927, 26931, 26946, 26975, 26991, 27039. |

12. The reception apparatus of claim 10, wherein the reserved tone set ($S_i$) is determined using:

$$S_i = \{i_k + x^*(l \bmod y) | i_k \in S_0, 0 \leq l < D_L\},$$

where $D_L$ denotes a number of the OFDM symbols.

13. A method for determining a reserved tone set to be used for reducing a Peak to Average Power Ratio (PAPR) in a transmission apparatus of an Orthogonal Frequency Division Multiplexing (OFDM) communication system, the method comprising: determining a shift value based on a subcarrier spacing interval (x), a number of spaced symbols (y) of a scattered pilot pattern, and OFDM symbol indices (I); and determining the reserved tone set ($S_i$) for OFDM symbols by shifting each of subcarriers ($i_k$) of a predetermined reserved tone set ($S_o$) by the shift value, wherein determining the shift value comprises: determining modular arithmetic of each of the OFDM symbol indices (I) with the number of spaced symbols (y); and determining the shift value by multiplying the subcarrier spacing interval (x) with a result of the modular arithmetic.

14. The method of claim 13, wherein the reserved tone set ($S_i$) is determined using:

$$S_i = \{i_k + x^*(l \bmod y) | i_k \in S_0, 0 \leq l < D_L\}$$

where $D_L$ denotes a number of the OFDM symbols.

15. The method of claim 13, wherein the predetermined reserved tone set ($S_0$) is shown in the following table:

| FFT size (Number of reserved carriers) | Reserved Tones |
|---|---|
| 1K (10) | 109, 117, 122, 129, 139, 321, 350, 403, 459, 465 |
| 2K (18) | 250, 404, 638, 677, 700, 712, 755, 952, 1125, 1145, 1190, 1276, 1325, 1335, 1406, 1431, 1472, 1481 |
| 4K (36) | 170, 219, 405, 501, 597, 654, 661, 745, 995, 1025, 1319, 1361, 1394, 1623, 1658, 1913, 1961, 1971, 2106, 2117, 2222, 2228, 2246, 2254, 2361, 2468, 2469, 2482, 2637, 2679, 2708, 2825, 2915, 2996, 3033, 3119 |
| 8K (72) | 111, 115, 123, 215, 229, 392, 613, 658, 831, 842, 997, 1503, 1626, 1916, 1924, 1961, 2233, 2246, 2302, 2331, 2778, 2822, 2913, 2927, 2963, 2994, 3087, 3162, 3226, 3270, 3503, 3585, 3711, 3738, 3874, 3902, 4013, 4017, 4186, 4253, 4292, 4339, 4412, 4453, 4669, 4910, 5015, 5030, 5061, 5170, 5263, 5313, 5360, 5384, 5394, 5493, 5550, 5847, 5901, 5999, 6020, 6165, 6174, 6227, 6245, 6314, 6316, 6327, 6503, 6507, 6545, 6565 |
| 16K (144) | 109, 122, 139, 171, 213, 214, 251, 585, 763, 1012, 1021, 1077, 1148, 1472, 1792, 1883, 1889, 1895, 1900, 2013, 2311, 2582, 2860, 2980, 3011, 3099, 3143, 3171, 3197, 3243, 3257, 3270, 3315, 3436, 3470, 3582, 3681, 3712, 3767, 3802, 3979, 4045, 4112, 4197, 4409, 4462, 4756, 5003, 5007, 5036, 5246, 5483, 5535, 5584, 5787, 5789, 6047, 6349, 6392, 6498, 6526, 6542, 6591, 6680, 6688, 6785, 6860, 7134, 7286, 7387, 7415, 7417, 7505, 7526, 7541, 7551, 7556, 7747, 7814, 7861, 7880, 8045, 8179, 8374, 8451, 8514, 8684, 8698, 8804, 8924, 9027, 9113, 9211, 9330, 9479, 9482, 9487, 9619, 9829, 10326, 10394, 10407, 10450, 10528, 10671, 10746, 10774, 10799, 10801, 10912, 11113, 11128, 11205, 11379, 11459, 11468, 11658, 11776, 11791, 11953, 11959, 12021, 12028, 12135, 12233, 12407, 12441, 12448, 12470, 12501, 12548, 12642, 12679, 12770, 12788, 12899, 12923, 12939, 13050, 13103, 13147, 13256, 13339, 13409 |
| 32K (288) | 164, 320, 350, 521, 527, 578, 590, 619, 635, 651, 662, 664, 676, 691, 723, 940, 1280, 1326, 1509, 1520, 1638, 1682, 1805, 1833, 1861, 1891, 1900, 1902, 1949, 1967, 1978, 1998, 2006, 2087, 2134, 2165, 2212, 2427, 2475, 2555, 2874, 3067, 3091, 3101, 3146, 3188, 3322, 3353, 3383, 3503, 3523, 3654, 3856, 4150, 4158, 4159, 4174, 4206, 4318, 4417, 4629, 4631, 4875, 5104, 5106, 5111, 5131, 5145, 5146, 5177, 5181, 5246, 5269, 5458, 5474, 5500, 5509, 5579, 5810, 5823, 6058, 6066, 6098, 6411, 6741, 6775, 6932, 7103, 7258, 7303, 7413, 7586, 7591, 7634, 7636, 7655, 7671, 7675, 7756, 7760, 7826, 7931, 7937, 7951, 8017, 8061, 8071, 8117, 8317, 8321, 8353, 8806, 9010, 9237, 9427, 9453, 9469, 9525, 9558, 9574, 9584, 9820, 9973, 10011, 10043, 10064, 10066, 10081, 10136, 10193, 10249, 10511, 10537, 11083, 11350, 11369, 11428, 11622, 11720, 11924, 11974, 11979, 12944, 12945, 13009, 13070, 13110, 13257, 13364, 13370, 13449, 13503, 13514, 13520, 13583, 13593, 13708, 13925, 14192, 14228, 14235, 14279, 14284, 14370, 14393, 14407, 14422, 14471, 14494, 14536, 14617, 14829, 14915, 15094, 15138, 15155, 15170, 15260, 15283, 15435, 15594, 15634, 15810, 16178, 16192, 16196, 16297, 16366, 16498, 16501, 16861, 16966, 17039, 17057, 17240, 17523, 17767, 18094, 18130, 18218, 18344, 18374, 18657, 18679, 18746, 18772, 18779, 18786, 18874, 18884, 18955, 19143, 19497, 19534, 19679, 19729, 19738, 19751, 19910, 19913, 20144, 20188, 20194, 20359, 20490, 20500, 20555, 20594, 20633, 20656, 21099, 21115, 21597, 22139, 22208, 22244, 22530, 22547, 22562, 22567, 22696, 22757, 22798, 22854, 22877, 23068, 23102, 23141, 23154, 23170, 23202, 23368, 23864, 24057, 24215, 24219, 24257, 24271, 24325, 24447, 25137, 25590, 25702, 25706, 25744, 25763, 25811, 25842, 25853, 25954, 26079, 26158, 26285, 26346, 26488, 26598, 26812, 26845, 26852, 26869, 26898, 26909, 26927, 26931, 26946, 26975, 26991, 27039. |

16. A method for determining a reserved tone set to be used for reducing a Peak to Average Power Ratio (PAPR) in a receiving apparatus of an Orthogonal Frequency Division Multiplexing (OFDM) communication system, the method comprising: determining a shift value based on a subcarrier spacing interval (x), a number of spaced symbols (y) of a scattered pilot pattern, and OFDM symbol indices (I); and determining the reserved tone set ($S_i$) for OFDM symbols by shifting each of subcarriers ($i_k$) of a predetermined reserved tone set ($S_o$) by the shift value, wherein determining the shift value comprises: determining modular arithmetic of each of the OFDM symbol indices (I) with the number of spaced symbols (y); and determining the shift value by multiplying the subcarrier spacing interval (x) with a result of the modular arithmetic.

17. The method of claim 16, wherein the reserved tone set ($S_i$) is determined using:

$$S_i = \{i_k + x^*(l \bmod y) | i_k \in S_0, 0 \leq l < D_L\},$$

where $D_L$ denotes a number of the OFDM symbols.

18. The method of claim 16, wherein the predetermined reserved tone set ($S_O$) is shown in the following table:

| FFT size (Number of reserved carriers) | Reserved Tones |
|---|---|
| 1K (10) | 109, 117, 122, 129, 139, 321, 350, 403, 459, 465 |
| 2K (18) | 250, 404, 638, 677, 700, 712, 755, 952, 1125, 1145, 1190, 1276, 1325, 1335, 1406, 1431, 1472, 1481 |
| 4K (36) | 170, 219, 405, 501, 597, 654, 661, 745, 995, 1025, 1319, 1361, 1394, 1623, 1658, 1913, 1961, 1971, 2106, 2117, 2222, 2228, 2246, 2254, 2361, 2468, 2469, 2482, 2637, 2679, 2708, 2825, 2915, 2996, 3033, 3119 |
| 8K (72) | 111, 115, 123, 215, 229, 392, 613, 658, 831, 842, 997, 1503, 1626, 1916, 1924, 1961, 2233, 2246, 2302, 2331, 2778, 2822, 2913, 2927, 2963, 2994, 3087, 3162, 3226, 3270, 3503, 3585, 3711, 3738, 3874, 3902, 4013, 4017, 4186, 4253, 4292, 4339, 4412, 4453, 4669, 4910, 5015, 5030, 5061, 5170, 5263, 5313, 5360, 5384, 5394, 5493, 5550, 5847, 5901, 5999, 6020, 6165, 6174, 6227, 6245, 6314, 6316, 6327, 6503, 6507, 6545, 6565 |
| 16K (144) | 109, 122, 139, 171, 213, 214, 251, 585, 763, 1012, 1021, 1077, 1148, 1472, 1792, 1883, 1889, 1895, 1900, 2013, 2311, 2582, 2860, 2980, 3011, 3099, 3143, 3171, 3197, 3243, 3257, 3270, 3315, 3436, 3470, 3582, 3681, 3712, 3767, 3802, 3979, 4045, 4112, 4197, 4409, 4462, 4756, 5003, 5007, 5036, 5246, 5483, 5535, 5584, 5787, 5789, 6047, 6349, 6392, 6498, 6526, 6542, 6591, 6680, 6688, 6785, 6860, 7134, 7286, 7387, 7415, 7417, 7505, 7526, 7541, 7551, 7556, 7747, 7814, 7861, 7880, 8045, 8179, 8374, 8451, 8514, 8684, 8698, 8804, 8924, 9027, 9113, 9211, 9330, 9479, 9482, 9487, 9619, 9829, 10326, 10394, 10407, 10450, 10528, 10671, 10746, 10774, 10799, 10801, 10912, 11113, 11128, 11205, 11379, 11459, 11468, 11658, 11776, 11791, 11953, 11959, 12021, 12028, 12135, 12233, 12407, 12441, 12448, 12470, 12501, 12548, 12642, 12679, 12770, 12788, 12899, 12923, 12939, 13050, 13103, 13147, 13256, 13339, 13409 |
| 32K (288) | 164, 320, 350, 521, 527, 578, 590, 619, 635, 651, 662, 664, 676, 691, 723, 940, 1280, 1326, 1509, 1520, 1638, 1682, 1805, 1833, 1861, 1891, 1900, 1902, 1949, 1967, 1978, 1998, 2006, 2087, 2134, 2165, 2212, 2427, 2475, 2555, 2874, 3067, 3091, 3101, 3146, 3188, 3322, 3353, 3383, 3503, 3523, 3654, 3856, 4150, 4158, 4159, 4174, 4206, 4318, 4417, 4629, 4631, 4875, 5104, 5106, 5111, 5131, 5145, 5146, 5177, 5181, 5246, 5269, 5458, 5474, 5500, 5509, 5579, 5810, 5823, 6058, 6066, 6098, 6411, 6741, 6775, 6932, 7103, 7258, 7303, 7413, 7586, 7591, 7634, 7636, 7655, 7671, 7675, 7756, 7760, 7826, 7931, 7937, 7951, 8017, 8061, 8071, 8117, 8317, 8321, 8353, 8806, 9010, 9237, 9427, 9453, 9469, 9525, 9558, 9574, 9584, 9820, 9973, 10011, 10043, 10064, 10066, 10081, 10136, 10193, 10249, 10511, 10537, 11083, 11350, 11369, 11428, 11622, 11720, 11924, 11974, 11979, 12944, 12945, 13009, 13070, 13110, 13257, 13364, 13370, 13449, 13503, 13514, 13520, 13583, 13593, 13708, 13925, 14192, 14228, 14235, 14279, 14284, 14370, 14393, 14407, 14422, 14471, 14494, 14536, 14617, 14829, 14915, 15094, 15138, 15155, 15170, 15260, 15283, 15435, 15594, 15634, 15810, 16178, 16192, 16196, 16297, 16366, 16498, 16501, 16861, 16966, 17039, 17057, 17240, 17523, 17767, 18094, 18130, 18218, 18344, 18374, 18657, 18679, 18746, 18772, 18779, 18786, 18874, 18884, 18955, 19143, 19497, 19534, 19679, 19729, 19738, 19751, 19910, 19913, 20144, 20188, 20194, 20359, 20490, 20500, 20555, 20594, 20633, 20656, 21099, 21115, 21597, 22139, 22208, 22244, 22530, 22547, 22562, 22567, 22696, 22757, 22798, 22854, 22877, 23068, 23102, 23141, 23154, 23170, 23202, 23368, 23864, 24057, 24215, 24219, 24257, 24271, 24325, 24447, 25137, 25590, 25702, 25706, 25744, 25763, 25811, 25842, 25853, 25954, 26079, 26158, 26285, 26346, 26488, 26598, 26812, 26845, 26852, 26869, 26898, 26909, 26927, 26931, 26946, 26975, 26991, 27039. |

19. A transmission apparatus for determining a reserved tone set used for reducing a Peak to Average Power Ratio (PAPR) in an Orthogonal Frequency Division Multiplexing (OFDM) communication system, the transmission apparatus comprising: a memory for storing a predetermined reserved tone set (So); and a controller for determining a shift value based on a subcarrier spacing interval (x), a number of spaced symbols (y) of a scattered pilot pattern, and OFDM symbol indices (I) and for determining the reserved tone set ($S_i$) for OFDM symbols by shifting each of subcarriers ($i_k$) of the predetermined reserved tone set (So) by the shift value, wherein the controller determines modular arithmetic of each of the OFDM symbol indices (I) with the number of spaced symbols (y) and determines the shift value by multiplying the subcarrier spacing interval (x) with a result of the modular arithmetic.

20. The transmission apparatus of claim 19, wherein the controller determines the reserved tone set ($S_i$) using:

$$S_i = \{i_k + x*(l \bmod y) | i_k \in S_0, 0 \leq l < D_L\}$$

where $D_L$ denotes a number of the OFDM symbols.

21. The transmission apparatus of claim 19, wherein the predetermined reserved tone set ($S_O$) is shown in the following table:

| FFT size (Number of reserved carriers) | Reserved Tones |
|---|---|
| 1K (10) | 109, 117, 122, 129, 139, 321, 350, 403, 459, 465 |
| 2K (18) | 250, 404, 638, 677, 700, 712, 755, 952, 1125, 1145, 1190, 1276, 1325, 1335, 1406, 1431, 1472, 1481 |
| 4K (36) | 170, 219, 405, 501, 597, 654, 661, 745, 995, 1025, 1319, 1361, 1394, 1623, 1658, 1913, 1961, 1971, 2106, 2117, 2222, 2228, 2246, 2254, 2361, 2468, 2469, 2482, 2637, 2679, 2708, 2825, 2915, 2996, 3033, 3119 |
| 8K (72) | 111, 115, 123, 215, 229, 392, 613, 658, 831, 842, 997, 1503, 1626, 1916, 1924, 1961, 2233, 2246, 2302, 2331, 2778, 2822, 2913, 2927, 2963, 2994, 3087, 3162, 3226, 3270, 3503, 3585, 3711, 3738, 3874, 3902, 4013, 4017, 4186, 4253, 4292, 4339, 4412, 4453, 4669, 4910, 5015, 5030, 5061, 5170, 5263, 5313, 5360, 5384, 5394, 5493, 5550, 5847, 5901, 5999, 6020, 6165, 6174, 6227, 6245, 6314, 6316, 6327, 6503, 6507, 6545, 6565 |
| 16K (144) | 109, 122, 139, 171, 213, 214, 251, 585, 763, 1012, 1021, 1077, 1148, 1472, 1792, 1883, 1889, 1895, 1900, 2013, 2311, 2582, 2860, 2980, 3011, 3099, 3143, 3171, 3197, 3243, 3257, 3270, 3315, 3436, 3470, 3582, 3681, 3712, 3767, 3802, 3979, 4045, 4112, 4197, 4409, 4462, 4756, 5003, 5007, 5036, 5246, 5483, 5535, 5584, 5787, 5789, 6047, 6349, 6392, 6498, 6526, 6542, 6591, 6680, 6688, 6785, 6860, 7134, 7286, 7387, 7415, 7417, 7505, 7526, 7541, 7551, 7556, 7747, 7814, 7861, 7880, 8045, 8179, 8374, 8451, 8514, 8684, 8698, 8804, 8924, 9027, 9113, 9211, 9330, 9479, 9482, 9487, 9619, 9829, 10326, 10394, 10407, 10450, 10528, 10671, 10746, 10774, 10799, 10801, 10912, 11113, 11128, 11205, 11379, 11459, 11468, 11658, 11776, 11791, 11953, 11959, 12021, 12028, 12135, 12233, 12407, 12441, 12448, 12470, 12501, 12548, 12642, 12679, 12770, 12788, 12899, 12923, 12939, 13050, 13103, 13147, 13256, 13339, 13409 |
| 32K (288) | 164, 320, 350, 521, 527, 578, 590, 619, 635, 651, 662, 664, 676, 691, 723, 940, 1280, 1326, 1509, 1520, 1638, 1682, 1805, 1833, 1861, 1891, 1900, 1902, 1949, 1967, 1978, 1998, 2006, 2087, 2134, 2165, 2212, 2427, 2475, 2555, 2874, 3067, 3091, 3101, 3146, 3188, 3322, 3353, 3383, 3503, 3523, 3654, 3856, 4150, 4158, 4159, 4174, 4206, 4318, 4417, 4629, 4631, 4875, 5104, 5106, 5111, 5131, 5145, 5146, 5177, 5181, 5246, 5269, 5458, 5474, 5500, 5509, 5579, 5810, 5823, 6058, 6066, 6098, 6411, 6741, 6775, 6932, 7103, 7258, 7303, 7413, 7586, 7591, 7634, 7636, 7655, 7671, 7675, 7756, 7760, 7826, 7931, 7937, 7951, 8017, 8061, 8071, 8117, 8317, 8321, 8353, 8806, 9010, 9237, 9427, 9453, 9469, 9525, 9558, 9574, 9584, 9820, 9973, 10011, 10043, 10064, 10066, 10081, 10136, 10193, 10249, 10511, 10537, 11083, 11350, 11369, 11428, 11622, 11720, 11924, 11974, 11979, 12944, 12945, 13009, 13070, 13110, 13257, 13364, 13370, 13449, 13503, 13514, 13520, 13583, 13593, 13708, 13925, 14192, 14228, 14235, 14279, 14284, 14370, 14393, 14407, 14422, 14471, 14494, 14536, 14617, 14829, 14915, 15094, 15138, 15155, 15170, 15260, 15283, 15435, 15594, 15634, 15810, 16178, 16192, 16196, 16297, 16366, 16498, 16501, 16861, 16966, 17039, 17057, |

| FFT size (Number of reserved carriers) | Reserved Tones |
|---|---|
| | 17240, 17523, 17767, 18094, 18130, 18218, 18344, 18374, 18657, 18679, 18746, 18772, 18779, 18786, 18874, 18884, 18955, 19143, 19497, 19534, 19679, 19729, 19738, 19751, 19910, 19913, 20144, 20188, 20194, 20359, 20490, 20500, 20555, 20594, 20633, 20656, 21099, 21115, 21597, 22139, 22208, 22244, 22530, 22547, 22562, 22567, 22696, 22757, 22798, 22854, 22877, 23068, 23102, 23141, 23154, 23170, 23202, 23368, 23864, 24057, 24215, 24219, 24257, 24271, 24325, 24447, 25137, 25590, 25702, 25706, 25744, 25763, 25811, 25842, 25853, 25954, 26079, 26158, 26285, 26346, 26488, 26598, 26812, 26845, 26852, 26869, 26898, 26909, 26927, 26931, 26946, 26975, 26991, 27039. |

22. A receiving apparatus for determining a reserved tone set used for reducing a Peak to Average Power Ratio (PAPR) in an Orthogonal Frequency Division Multiplexing (OFDM) communication system, the receiving apparatus comprising: a memory for storing a predetermined reserved tone set (So); and a controller for determining a shift value based on a subcarrier spacing interval (x), a number of spaced symbols (y) of a scattered pilot pattern, and OFDM symbol indices (I) and for determining the reserved tone set ($S_i$) for OFDM symbols by shifting each of subcarriers ($i_k$) of a predetermined reserved tone set (So) by the shift value, wherein the controller determines modular arithmetic of each of the OFDM symbol indices (I) with the number of spaced symbols (y) and determines the shift value by multiplying the subcarrier spacing interval (x) with a result of the modular arithmetic.

23. The reception apparatus of claim 22, wherein the reserved tone set ($S_i$) is determined using:

$$S_i = \{i_k + x^*(l \bmod y) | i_k \in S_0, 0 \leq l < D_L\},$$

where $D_L$ denotes a number of the OFDM symbols.

24. The receiving apparatus of claim 22, wherein the predetermined reserved tone set ($S_0$) is shown in the following table:

| FFT size (Number of reserved carriers) | Reserved Tones |
|---|---|
| 1K (10) | 109, 117, 122, 129, 139, 321, 350, 403, 459, 465 |
| 2K (18) | 250, 404, 638, 677, 700, 712, 755, 952, 1125, 1145, 1190, 1276, 1325, 1335, 1406, 1431, 1472, 1481 |
| 4K (36) | 170, 219, 405, 501, 597, 654, 661, 745, 995, 1025, 1319, 1361, 1394, 1623, 1658, 1913, 1961, 1971, 2106, 2117, 2222, 2228, 2246, 2254, 2361, 2468, 2469, 2482, 2637, 2679, 2708, 2825, 2915, 2996, 3033, 3119 |
| 8K (72) | 111, 115, 123, 215, 229, 392, 613, 658, 831, 842, 997, 1503, 1626, 1916, 1924, 1961, 2233, 2246, 2302, 2331, 2778, 2822, 2913, 2927, 2963, 2994, 3087, 3162, 3226, 3270, 3503, 3585, 3711, 3738, 3874, 3902, 4013, 4017, 4186, 4253, 4292, 4339, 4412, 4453, 4669, 4910, 5015, 5030, 5061, 5170, 5263, 5313, 5360, 5384, 5394, 5493, 5550, 5847, 5901, 5999, 6020, 6165, 6174, 6227, 6245, 6314, 6316, 6327, 6503, 6507, 6545, 6565 |
| 16K (144) | 109, 122, 139, 171, 213, 214, 251, 585, 763, 1012, 1021, 1077, 1148, 1472, 1792, 1883, 1889, 1895, 1900, 2013, 2311, 2582, 2860, 2980, 3011, 3099, 3143, 3171, 3197, 3243, 3257, 3270, 3315, 3436, 3470, 3582, 3681, 3712, 3767, 3802, 3979, 4045, 4112, 4197, 4409, 4462, 4756, 5003, 5007, 5036, 5246, 5483, 5535, 5584, 5787, 5789, 6047, 6349, 6392, 6498, 6526, 6542, 6591, 6680, 6688, 6785, 6860, 7134, 7286, 7387, 7415, 7417, 7505, 7526, 7541, 7551, 7556, 7747, 7814, 7861, 7880, 8045, 8179, 8374, 8451, 8514, 8684, 8698, 8804, 8924, 9027, 9113, 9211, 9330, 9479, 9482, 9487, 9619, 9829, 10326, 10394, 10407, 10450, 10528, 10671, 10746, 10774, 10799, 10801, 10912, 11113, 11128, 11205, 11379, 11459, 11468, 11658, 11776, 11791, 11953, 11959, 12021, 12028, 12135, 12233, 12407, 12441, 12448, 12470, 12501, 12548, 12642, 12679, 12770, 12788, 12899, 12923, 12939, 13050, 13103, 13147, 13256, 13339, 13409 |
| 32K (288) | 164, 320, 350, 521, 527, 578, 590, 619, 635, 651, 662, 664, 676, 691, 723, 940, 1280, 1326, 1509, 1520, 1638, 1682, 1805, 1833, 1861, 1891, 1900, 1902, 1949, 1967, 1978, 1998, 2006, 2087, 2134, 2165, 2212, 2427, 2475, 2555, 2874, 3067, 3091, 3101, 3146, 3188, 3322, 3353, 3383, 3503, 3523, 3654, 3856, 4150, 4158, 4159, 4174, 4206, 4318, 4417, 4629, 4631, 4875, 5104, 5106, 5111, 5131, 5145, 5146, 5177, 5181, 5246, 5269, 5458, 5474, 5500, 5509, 5579, 5810, 5823, 6058, 6066, 6098, 6411, 6741, 6775, 6932, 7103, 7258, 7303, 7413, 7586, 7591, 7634, 7636, 7655, 7671, 7675, 7756, 7760, 7826, 7931, 7937, 7951, 8017, 8061, 8071, 8117, 8317, 8321, 8353, 8806, 9010, 9237, 9427, 9453, 9469, 9525, 9558, 9574, 9584, 9820, 9973, 10011, 10043, 10064, 10066, 10081, 10136, 10193, 10249, 10511, 10537, 11083, 11350, 11369, 11428, 11622, 11720, 11924, 11974, 11979, 12944, 12945, 13009, 13070, 13110, 13257, 13364, 13370, 13449, 13503, 13514, 13520, 13583, 13593, 13708, 13925, 14192, 14228, 14235, 14279, 14284, 14370, 14393, 14407, 14422, 14471, 14494, 14536, 14617, 14829, 14915, 15094, 15138, 15155, 15170, 15260, 15283, 15435, 15594, 15634, 15810, 16178, 16192, 16196, 16297, 16366, 16498, 16501, 16861, 16966, 17039, 17057, 17240, 17523, 17767, 18094, 18130, 18218, 18344, 18374, 18657, 18679, 18746, 18772, 18779, 18786, 18874, 18884, 18955, 19143, 19497, 19534, 19679, 19729, 19738, 19751, 19910, 19913, 20144, 20188, 20194, 20359, 20490, 20500, 20555, 20594, 20633, 20656, 21099, 21115, 21597, 22139, 22208, 22244, 22530, 22547, 22562, 22567, 22696, 22757, 22798, 22854, 22877, 23068, 23102, 23141, 23154, 23170, 23202, 23368, 23864, 24057, 24215, 24219, 24257, 24271, 24325, 24447, 25137, 25590, 25702, 25706, 25744, 25763, 25811, 25842, 25853, 25954, 26079, 26158, 26285, 26346, 26488, 26598, 26812, 26845, 26852, 26869, 26898, 26909, 26927, 26931, 26946, 26975, 26991, 27039. |

\* \* \* \* \*